(12) United States Patent
Mori et al.

(10) Patent No.: US 7,525,682 B2
(45) Date of Patent: Apr. 28, 2009

(54) INFORMATION PROCESSING APPARATUS, PRINT CONTROL METHOD THEREFOR, AND STORAGE MEDIUM

(75) Inventors: Yasuo Mori, Kanagawa (JP); Koji Nakagiri, Kanagawa (JP); Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1005 days.

(21) Appl. No.: 10/090,837

(22) Filed: Mar. 6, 2002

(65) Prior Publication Data

US 2002/0131086 A1 Sep. 19, 2002

(30) Foreign Application Priority Data

Mar. 8, 2001 (JP) .............................. 2001-065382
Feb. 15, 2002 (JP) .............................. 2002-039038

(51) Int. Cl.
*G06K 15/00* (2006.01)
*G06F 3/12* (2006.01)
(52) U.S. Cl. ...................... 358/1.18; 358/1.1
(58) Field of Classification Search ............... 358/1.18, 358/1.1, 1.2, 1.4, 1.5, 1.6, 1.9, 1.11, 1.12, 358/1.13, 1.14, 1.15, 1.16, 1.17, 540, 537, 358/527, 401, 407, 450, 468, 453; 399/1, 399/2, 8, 361, 364, 374, 383, 385, 391; 715/274, 715/273, 277, 251, 252, 253, 243, 246, 247; 347/2, 3, 5, 14, 23
See application file for complete search history.

(56) References Cited

U.S. PATENT DOCUMENTS

| | | | | | |
|---|---|---|---|---|---|
| 5,495,561 | A | * | 2/1996 | Holt | 358/1.15 |
| 5,506,661 | A | * | 4/1996 | Hanzawa | 399/1 |
| 5,995,719 | A | * | 11/1999 | Bourdead'hui et al. | 358/1.12 |
| 6,307,637 | B1 | | 10/2001 | Kujirai | 358/1.11 |

FOREIGN PATENT DOCUMENTS

| | | |
|---|---|---|
| JP | 7-276734 | 10/1995 |
| JP | 10-309841 A | 11/1998 |
| JP | 2000-177196 | 6/2000 |

* cited by examiner

*Primary Examiner*—Dov Popovici
(74) *Attorney, Agent, or Firm*—Fitzpatrick, Cella, Harper & Scinto

(57) ABSTRACT

In a print control method for an information processing apparatus which segments a surface of a sheet into a plurality of areas and controls layout of print data in the respective segmented areas, print settings are made, and it is determined whether a surface to an imposition process is an upper or lower surface. Page orders on the upper and lower surfaces which match each other are set in accordance with the determination result. An imposition process is performed on the basis of the set page orders.

24 Claims, 31 Drawing Sheets

FIG. 10

| | |
|---|---|
| ID BY WHICH JOB CAN BE IDENTIFIED | ~1001 |
| JOB SETTING INFORMATION | ~1002 |
| NUMBER OF PHYSICAL PAGES OF JOB | ~1003 |
| FIRST PHYSICAL PAGE INFORMATION | ~1004 |
| SECOND PHYSICAL PAGE INFORMATION | ~1005 |
|  | ~1006 |
| LAST PHYSICAL PAGE INFORMATION | ~1007 |

FIG. 11

| | |
|---|---|
| TOTAL NUMBER OF PHYSICAL PAGES | ~1101 |
| TOTAL NUMBER OF LOGICAL PAGES | ~1102 |
| NUMBER OF SETS | ~1103 |
| PRINTING ON SET BASIS | ~1104 |
| FINISHING INFORMATION | ~1105 |
| ADDITIONAL PRINT INFORMATION | ~1106 |

FIG. 13

| | |
|---|---|
| PAGE ORDER OF LOGICAL PAGES ON PHYSICAL PAGE | ~1301 |
| UPPER OR LOWER SURFACE IN 2 SIDED PRINTING | ~1302 |
| COLOR OR MONOCHROME PAGE | ~1303 |
| ADDITIONAL PRINT INFORMATION | ~1304 |

FIG. 18

FIG. 24
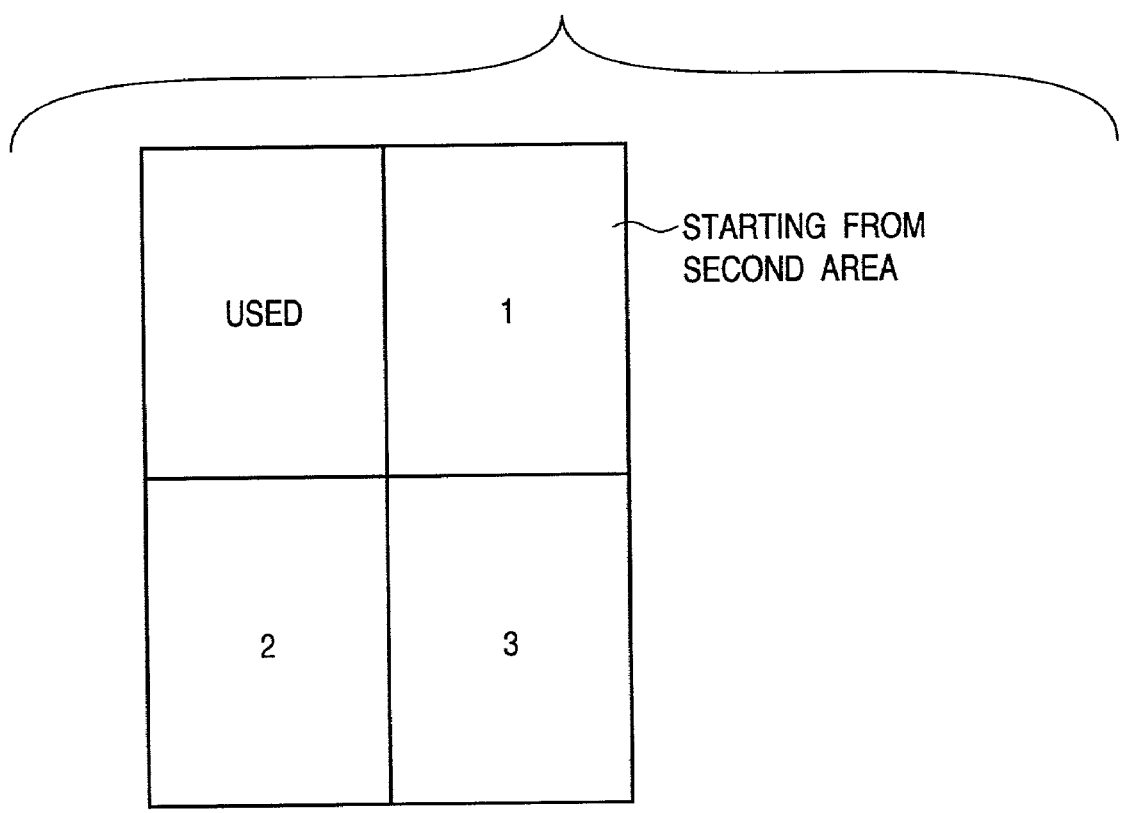
STARTING FROM SECOND AREA
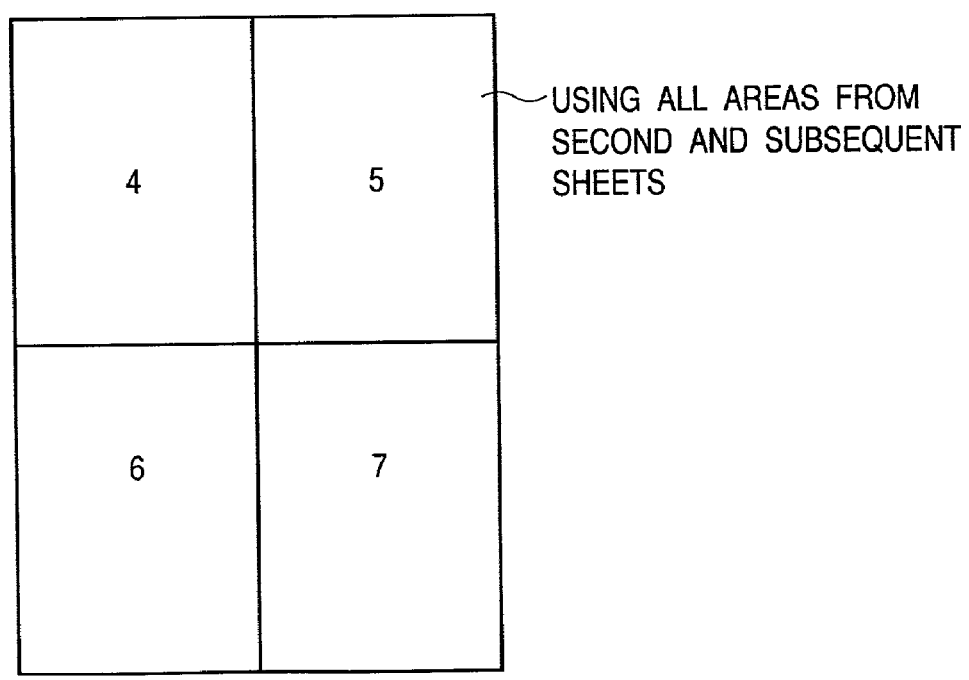
USING ALL AREAS FROM SECOND AND SUBSEQUENT SHEETS

INFORMATION PROCESSING APPARATUS, PRINT CONTROL METHOD THEREFOR, AND STORAGE MEDIUM

FIELD OF THE INVENTION

The present invention relates to an information processing apparatus which generates print data that can be printed by a printer, a print control method for the apparatus, and a storage medium.

BACKGROUND OF THE INVENTION

Conventionally, when printing is to be performed on postcards, a method of performing printing on the postcards one by one is generally used. In this case, many wordprocessors or so-called envelope addressers support layouts in accordance with postal cards, and allow zip codes and the like to be precisely set in printed frames.

A four-postcard sheet is also available, on which four postcards are arranged in a 2×2 matrix.

Such four-postcard sheets can be used even in conventional printers which could not use postcards because their paper size was too small. A printer designed to charge a user based on the print speed or the number of sheets printed is required to support the use of four-postcard sheets because of the economical reason, that is, the charge reduces to ¼.

In order to provide a layout scheme capable of precisely setting all data in the four postcard frames on such a four-postcard sheet, the page order of the data must be controlled such that the upper-surface data (addresses) and the lower-surface data (texts) must properly correspond to each other. An address and text may not match, and wrong data may be used for a given person.

In addition, if not all four surfaces are used, the remaining surface is wasted. In the case of a four-postal-card sheet, in particular, not only paper but also the cost of a postage stamp is wasted.

In the case of a four-postcard sheet, a fixed layout is used. If, therefore, preceding settings such as a binding margin and enlargement/reduction are left unchanged, this directly leads to print errors.

Furthermore, a four-postcard sheet is a special sheet, which demands management of security and charging.

SUMMARY OF THE INVENTION

The present invention has been made to solve the above problems, and has as its object to provide an information processing apparatus which can segment a sheet into a plurality of areas and lays out upper- and lower-surface data in the respective segmented areas in correspondence with each other, a print control method for the apparatus, and a storage medium.

In order to achieve the above object, according to one aspect of the present invention, there is provided an information processing apparatus which segments a surface of a sheet into a plurality of areas and controls layout of print data in the respective segmented areas, comprising print setting means for making a print setting, determination means for determining whether a surface to an imposition process is an upper or lower surface, page order setting means for setting page orders on the upper and lower surfaces which match each other in accordance with the determination result, and imposition process means for performing an imposition process on the basis of the set page orders.

According to an aspect of the present invention, there is provided a print control method for an information processing apparatus which segments a surface of a sheet into a plurality of areas and controls layout of print data in the respective segmented areas, comprising the print setting step of making a print setting, the determination step of determining whether a surface to an imposition process is an upper or lower surface, the page order setting step of setting page orders on the upper and lower surfaces which match each other in accordance with the determination result, and the imposition process step of performing an imposition process on the basis of the set page orders.

According to an aspect of the present invention, there is provided a computer-readable storage medium storing a program for a print control method for an information processing apparatus which segments a surface of a sheet into a plurality of areas and controls layout of print data in the respective segmented areas, the program including a module for generating a control command to a printer, a print setting module for making a print setting, a determination module for determining whether a surface to an imposition process is an upper or lower surface, a page order setting module for setting page orders on the upper and lower surfaces which match each other in accordance with the determination result, and an imposition process module for performing an imposition process on the basis of the set page orders.

According to an aspect of the present invention, there is provided a program for a print control program for an information processing apparatus which segments a surface of a sheet into a plurality of areas and controls layout of print data in the respective segmented areas, the program causing a computer to execute the step of generating a control command to a printer, the print setting step of making a print setting, the determination step of determining whether a surface to an imposition process is an upper or lower surface, the page order setting step of setting page orders on the upper and lower surfaces which match each other in accordance with the determination result, and the imposition process step of performing an imposition process on the basis of the set page orders.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing an example of a job output setting file in this embodiment;

FIG. 11 is a view showing an example of job setting information in a field 1002 in FIG. 10;

FIG. 13 is a view showing an example of physical page information in a field 1202 in FIG. 12;

FIG. 18 is a view showing a job setting window;

FIG. 24 is a view for explaining the concept of the processing of performing printing on the remaining portions of a sheet that has been used halfway;

DETAILED DESCRIPTION OF THE PREFERRED EMBODIMENT

An embodiment of the present invention will be described in detail below with reference to the accompanying drawings.

Prior to a description of this embodiment, a description will be made on the arrangement of a system constituted by a printer to which the present invention can be applied and an information processing apparatus such as a personal computer connected to the printer, and more specifically, the arrangement of a printing system including a spooler serving as a spool means for temporarily storing print data in a data form (so-called intermediate code) different from the form of the print data to be sent to the printer before generation of the print data to be transmitted to the printer, a despooler serving as a despooling means for generating the print data to be finally sent to the printer from the data temporarily stored in this intermediate code form, and a printer driver serving as a means for generating a printer control command.

Figure 1:
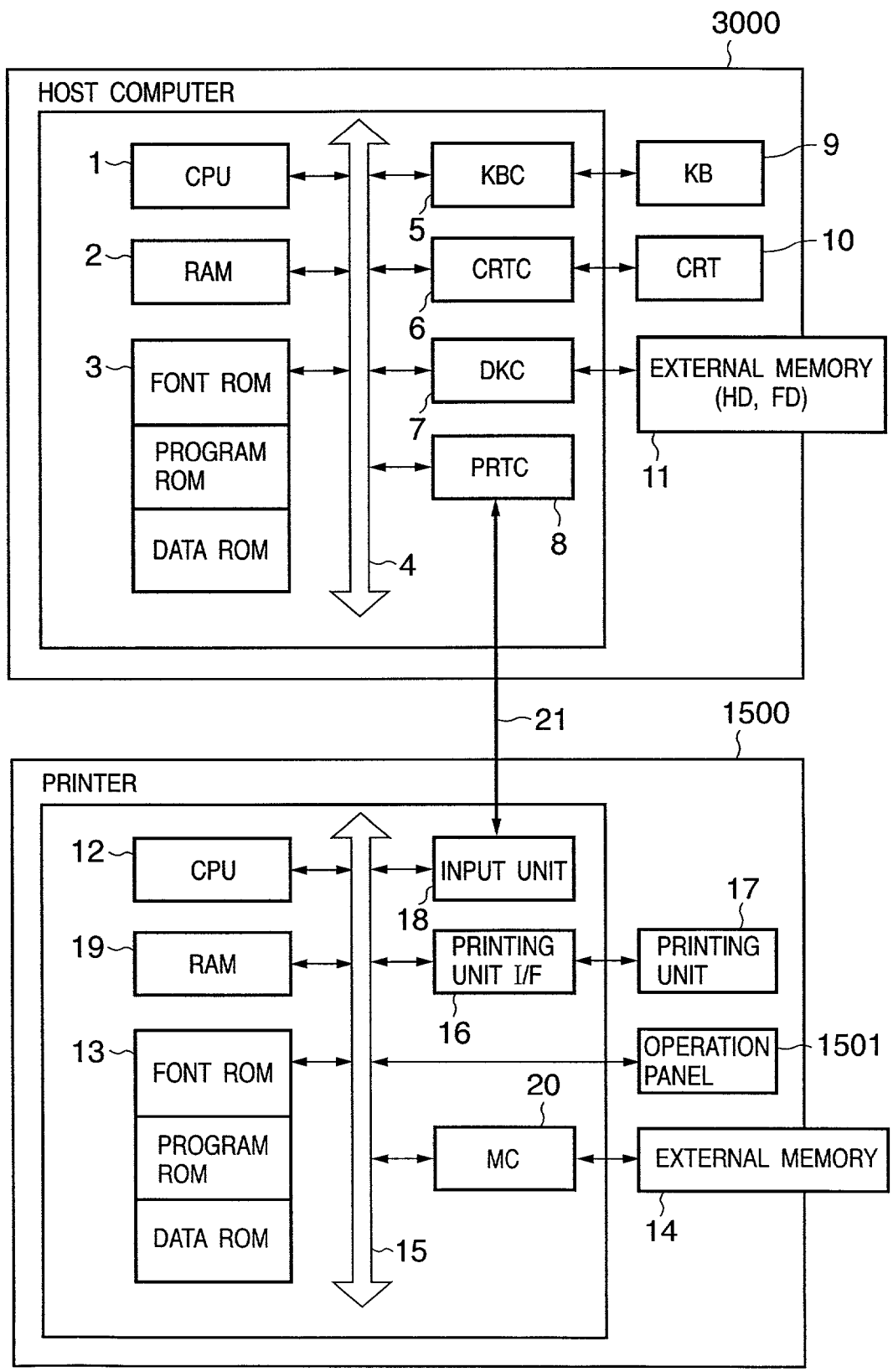
FIG. 1 is a block diagram showing the arrangement of a printer control system according to an embodiment of the present invention.

FIG. 1 is a block diagram showing the arrangement of a printer control system according to this embodiment. As shown in FIG. 1, the printer control system is comprised of a host computer 3000 and printer 1500.

The present invention can be applied to a single device, a system constituted by a plurality of devices, and a system connected through a network such as a LAN or WAN to perform processing.

The host computer 3000 shown in FIG. 1 includes a CPU 1 which processes documents containing mixtures of graphic patterns, images, characters, tables (including spreadsheets), and the like on the basis of document processing programs and the like stored in a program ROM in a ROM 3 or an external memory (HD, FD) 11. The CPU 1 systematically controls the respective devices connected to a system bus 4. An operating system (to be referred to as an "OS" hereinafter) and the like serving as control programs for the CPU 1 are stored in the program ROM in the ROM 3 or the external memory 11. Font data and the like are stored in the font ROM in the ROM 3 or the external memory 11. Various data to be used for document processing and the like are stored in the data ROM in the ROM 3 and the external memory 11. A RAM 2 functions as the main memory, work area, and the like of the CPU 1.

In the host computer 3000, reference numeral 5 denotes a keyboard controller (KBC) for controlling inputs from a keyboard 9 or pointing device (not shown); 6, a CRT controller (CRTC) for controlling a CRT display (CRT) 10; 7, a disk controller (DKC) for controlling access to the external memories 11 such as a hard disk (HD) and floppy disk (FD) in which a boot program, various applications, font data, user files, edit files, printer control command generation program (to be referred to as a "printer driver" hereinafter), and the like are stored; and 8, a printer controller (PRTC) for executing communication control processing with the printer 1500 through a bidirectional interface (interface) 21.

Note that the CPU 1 rasterizes, for example, an outline font to a display information area set on the RAM 2 to realize WYSIWYG on the CRT 10. The CPU 1 also executes various data processes by opening various registered windows on the basis of commands designated with a mouse cursor (not shown) on the CRT 10. This allows the user to open windows associated with print settings, in executing printing operation, so as to set the printer and set a print processing method for the printer driver, including selection of a print mode and the like.

In the printer 1500, reference numeral 12 denotes a CPU which outputs an image signal as output information to a printing unit (printer engine) 17 connected to a system bus 15 on the basis of control programs and the like stored in a program ROM in a ROM 13 and control programs and the like stored in an external memory 14. Control programs and the like for the CPU 12 are stored in the program ROM in the ROM 13. Font data and the like to be used to generate output information are stored in the font ROM in the ROM 13. Information and the like to be used on a host computer are stored in the data ROM in the ROM 13 in a printer in the absence of the external memory 14 such as a hard disk.

The CPU 12 can perform communication processing with the host computer 3000 through an input unit 18, and can notify the host computer 3000 of information and the like in the printer 1500. A RAM 19 functions as the main memory, work area, and the like of the CPU 12 and is designed to expand its memory capacity with an optioned RAM connected to an expansion port (not shown).

Note that the RAM 19 is used as an output information development area, environmental data storage area, NVRAM, and the like. A memory controller (MC) 20 controls access to the above external memory 14 such as a hard disk (HD) or IC card. The external memory 14 is connected as an option to store font data, an emulation program, form data, and the like. An operation panel 1501 is comprised of switches, LED display devices, and the like which are used for operation.

The number of external memories 14 described above may not be limited to one, and this system may be designed to allow connection of a plurality of optional cards and a plurality of external memories which store programs for interpreting printer control languages based on different language systems, in addition to the built-in fonts. Furthermore, the system may have an NVRAM (not shown) to store printer mode setting information from the operation panel 1501.

Typical print processing to be executed by a host computer to which a printing apparatus such as a printer is connected directly or through a network will be described next.

Figure 2:
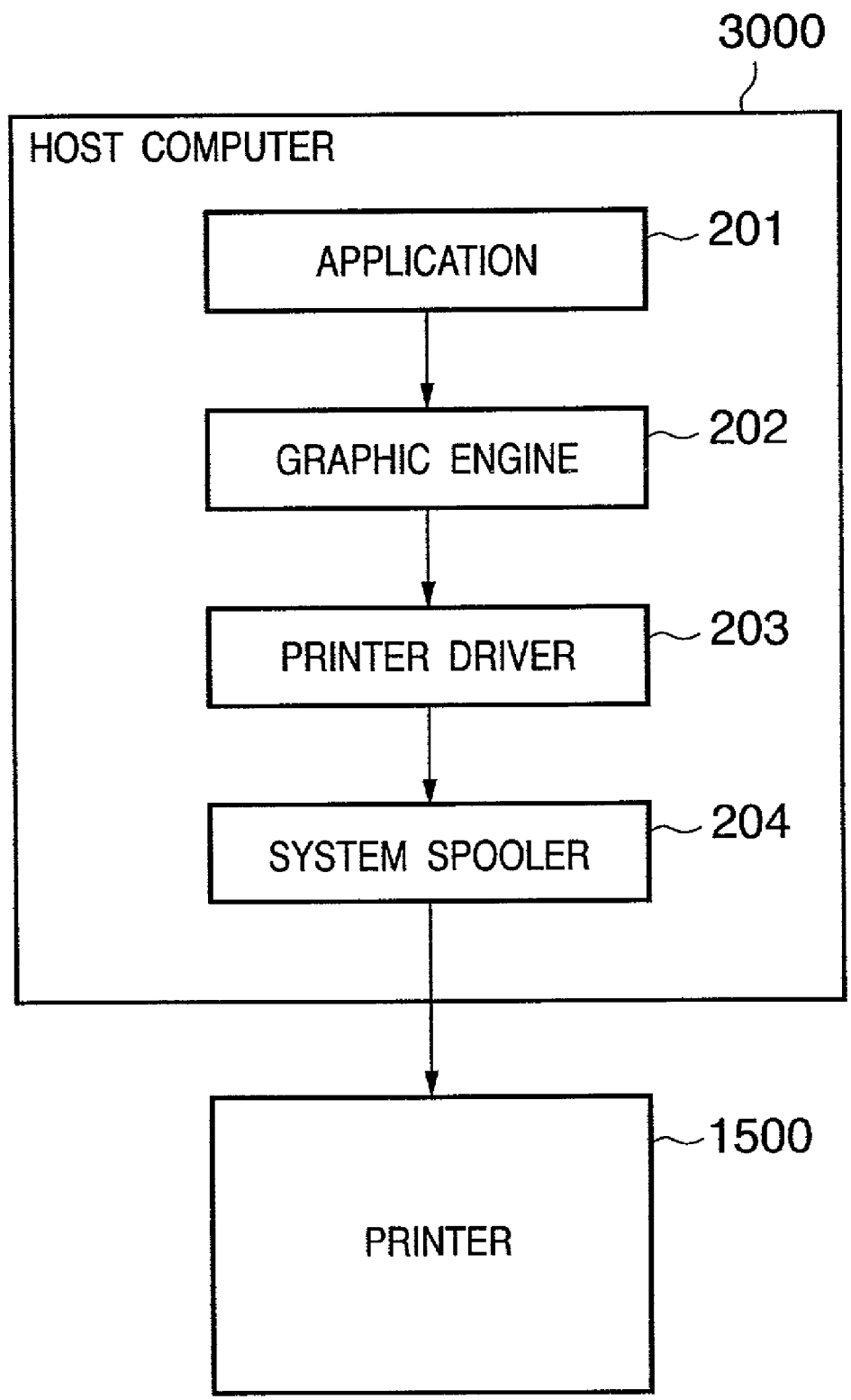
FIG. 2 is a block diagram showing print processing executed by a host computer 3000.

FIG. 2 shows the print processing executed by the host computer 3000. Referring to FIG. 2, an application 201, graphic engine 202, printer driver 203, and system spooler 204 exist as files stored in the external memory 11, and serve as program modules each of which is loaded into the RAM 2 by the OS or another module that uses it when it is executed. The application 201 and printer driver 203 can also be installed in the HD as the external memory 11 through the FD as the external memory 11, a CD-ROM (not shown), or a network (not shown).

First of all, the application 201 stored in the external memory 11 is loaded into the RAM 2 and executed. When the keyboard 9 or a mouse (not shown) is operated to give an instruction to perform printing from the application 201 to the printer 1500, output operation (printing) is performed by using the graphic engine 202 that is also loaded into the RAM 2 and set in a ready condition.

In this case, the graphic engine 202 loads the printer driver 203 prepared for each printing apparatus from the external memory 11 into the RAM 2, and sets an output from the application 201 in the printer driver 203. The graphic engine 202 then converts a GDI (Graphic Device Interface) function received from the application 201 into the DDI (Device Driver Interface) function, and outputs the DDI function to the printer driver 203.

The printer driver 203 converts the DDI function received from the graphic engine 202 into a control command that can be recognized by the printer 1500, e.g., a PDL (Page Description Language) command. The converted printer control command is transferred to the system spooler 204 loaded into the RAM 2 by the OS and output as print data to the printer 1500 through the interface 21.

The printing system according to this embodiment will be described next. This embodiment has an arrangement for temporarily spooling print data from an application in the form of intermediate code data, as shown in FIG. 3, in addition to the printing system constituted by the printer and host computer shown in FIG. 2.

Figure 3:
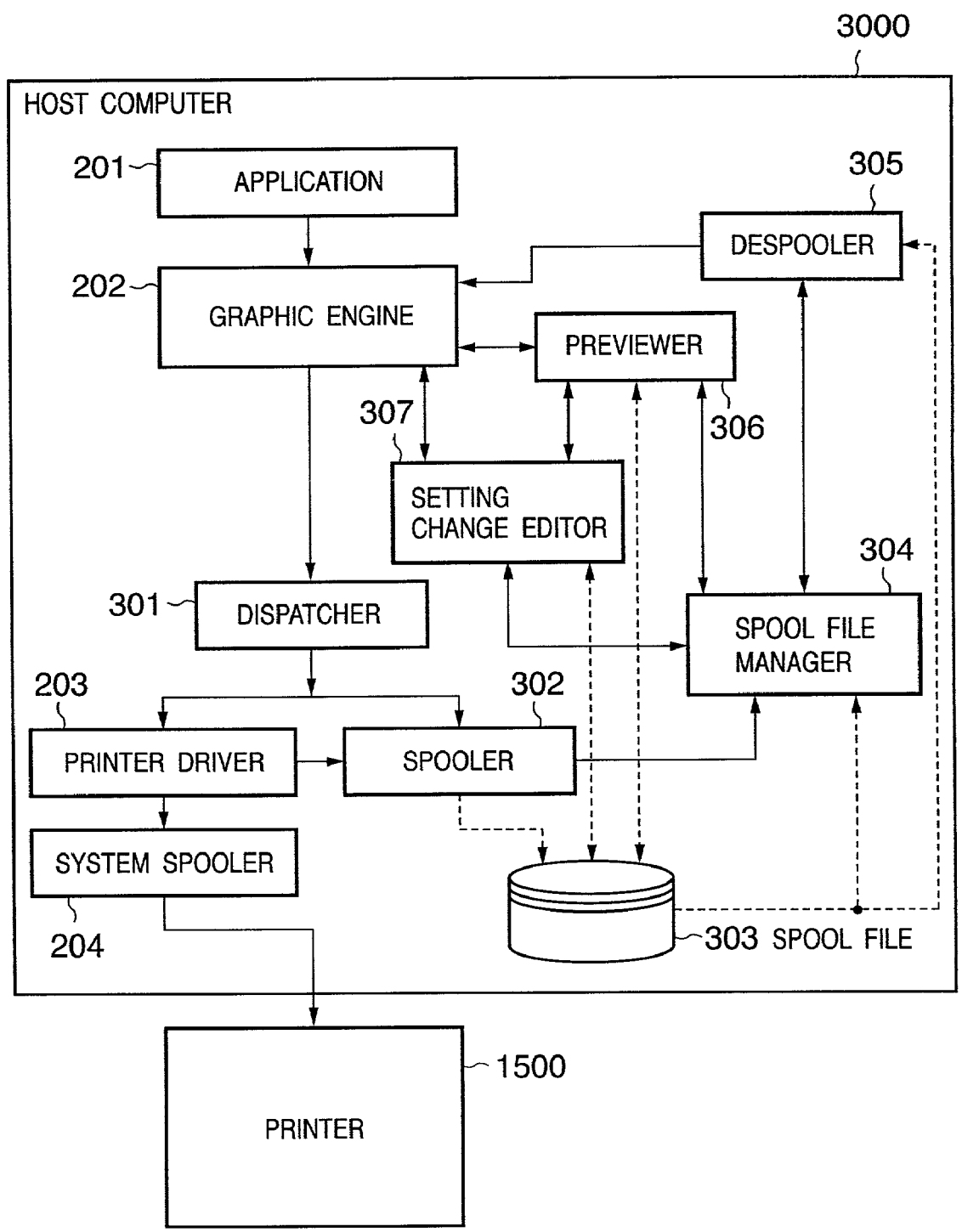
FIG. 3 is a block diagram showing an arrangement for temporarily spooling a print instruction from an application in the form of intermediate code data.

FIG. 3 shows the arrangement obtained by extending the system shown in FIG. 2. In this arrangement, when a print instruction is to be sent from the graphic engine 202 to the printer driver 203, a spool file 303 formed by an intermediate code is temporarily generated.

In the system shown in FIG. 2, the application 201 is released from print processing when the printer driver 203 completely converts all print instructions from the graphic engine 202 into control commands.

In contrast to this, in the system shown in FIG. 3, the application 201 is released when a spooler 302 completely converts all print instructions into intermediate code data and outputs the data to the spool file 303. According to the system shown in FIG. 3, therefore, the application 201 is released from print processing in a short period of time. In addition, in the system shown in FIG. 3, the contents of the spool file 303 can be processed. This makes it possible to realize functions which the application 201 does not provide, e.g., the functions of enlarging/reducing print data from the application 201, and printing data upon reducing a plurality of pages into one page.

As described above, in comparison with the system shown in FIG. 2, the system shown in FIG. 3 is extended to spool intermediate code data. In general, to process print data, settings are made from windows provided by the printer driver 203, and the printer driver 203 stores the set contents in the RAM 2 or external memory 11.

Print processing in the system shown in FIG. 3 will be described in detail next. As shown in FIG. 3, in this extended processing scheme, a dispatcher 301 receives a DDI function as a print instruction from the graphic engine 202. If the print instruction (DDI function) received from the graphic engine 202 is based on the print instruction (GDI function) issued from the application 201 to the graphic engine 202, the dispatcher 301 loads the spooler 302 stored in the external memory 11 into the RAM 2 and sends the print instruction (DDI function) to the spooler 302 instead of the printer driver 203.

The spooler 302 analyzes the received print instruction, converts it into intermediate codes on a page basis, and outputs the codes to the spool file 303. A spool file of such intermediate codes stored on a page basis will be referred to as a page description file (PDF). In addition, the spooler 302 acquires, from the printer driver 203, process settings (bookbinding/printing, Nup, 2 sided, stapling, color/monochrome, and the like) associated with print data which are set with respect to the printer driver 203, and stores them as job-specific files in the spool file 303. Each setting file stored on a job basis will be referred to as a job setting file (abbreviated as SDF: Spool Description File). This job setting file will be further described later.

Although the spool file 303 is generated as a file in the external memory 11, it may be generated in the RAM 2. The spooler 302 loads a spool file manager 304 stored in the external memory 11 into the RAM 2, and notifies the spool file manager 304 of the generated state of the spool file 303. The spool file manager 304 then determines whether printing can be performed in accordance with the contents of process settings associated with the print data stored in the spool file 303.

In this case, if the spool file manager 304 determines that printing can be performed by using the graphic engine 202, the spool file manager 304 loads a despooler 305 stored in the external memory 11 into the RAM 2 and gives the despooler 305 an instruction to perform print processing for the intermediate code page description file described in the spool file 303. With this operation, the despooler 305 generates a GDI function again by processing the intermediate code page description file contained in the spool file 303 in accordance with a job setting file that includes process setting information and is contained in the spool file 303, and outputs the GDI function through the graphic engine 202.

If the print instruction (DDI function) received from the graphic engine 202 is based on the print instruction (GDI function) issued from the despooler 305 to the graphic engine 202, the dispatcher 301 sends a print instruction to the printer driver 203 instead of the spooler 302. With this operation, the printer driver 203 generates a printer control command formed by a page description language or the like on the basis of the DDI function acquired from the graphic engine 202, and outputs the command to the printer 1500 through the system spooler 204.

FIG. 3 shows an example of a system having a previewer 306 and setting change editor 307, in addition to the arrangement of the extended system described above, to allow previewing, print setting changing, and merging of a plurality of jobs.

Figure 9:
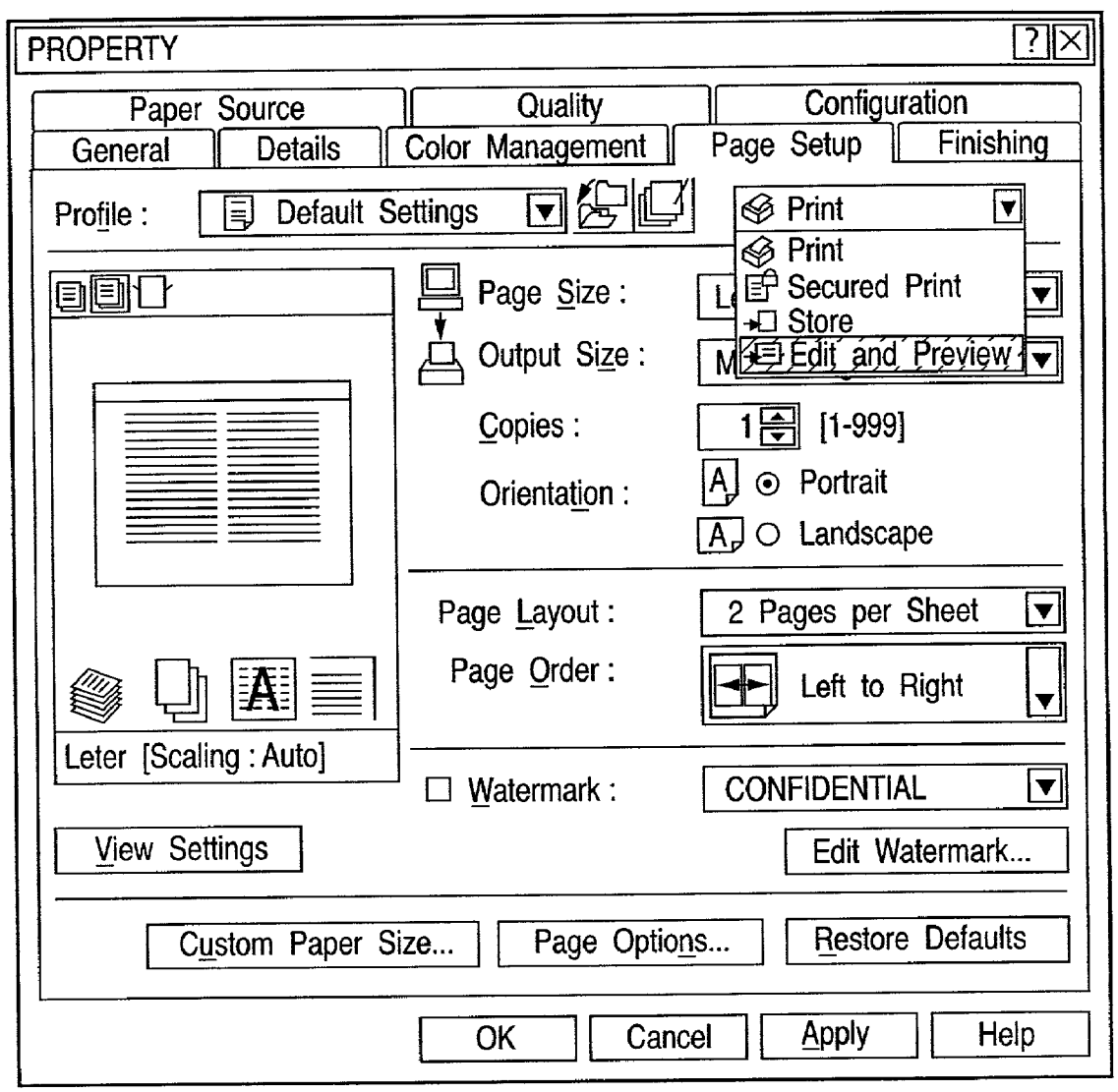
FIG. 9 is a view showing a property window of a printer driver.

To perform print previewing, print setting changing, and merging of a plurality of jobs, the user must designate "store" by a pull-down menu serving as a means for "designating output destination" on the property window of the printer driver shown in FIG. 9. If the user wants to see only a preview, he/she can select "preview" as designation of an output destination.

Figure 16:
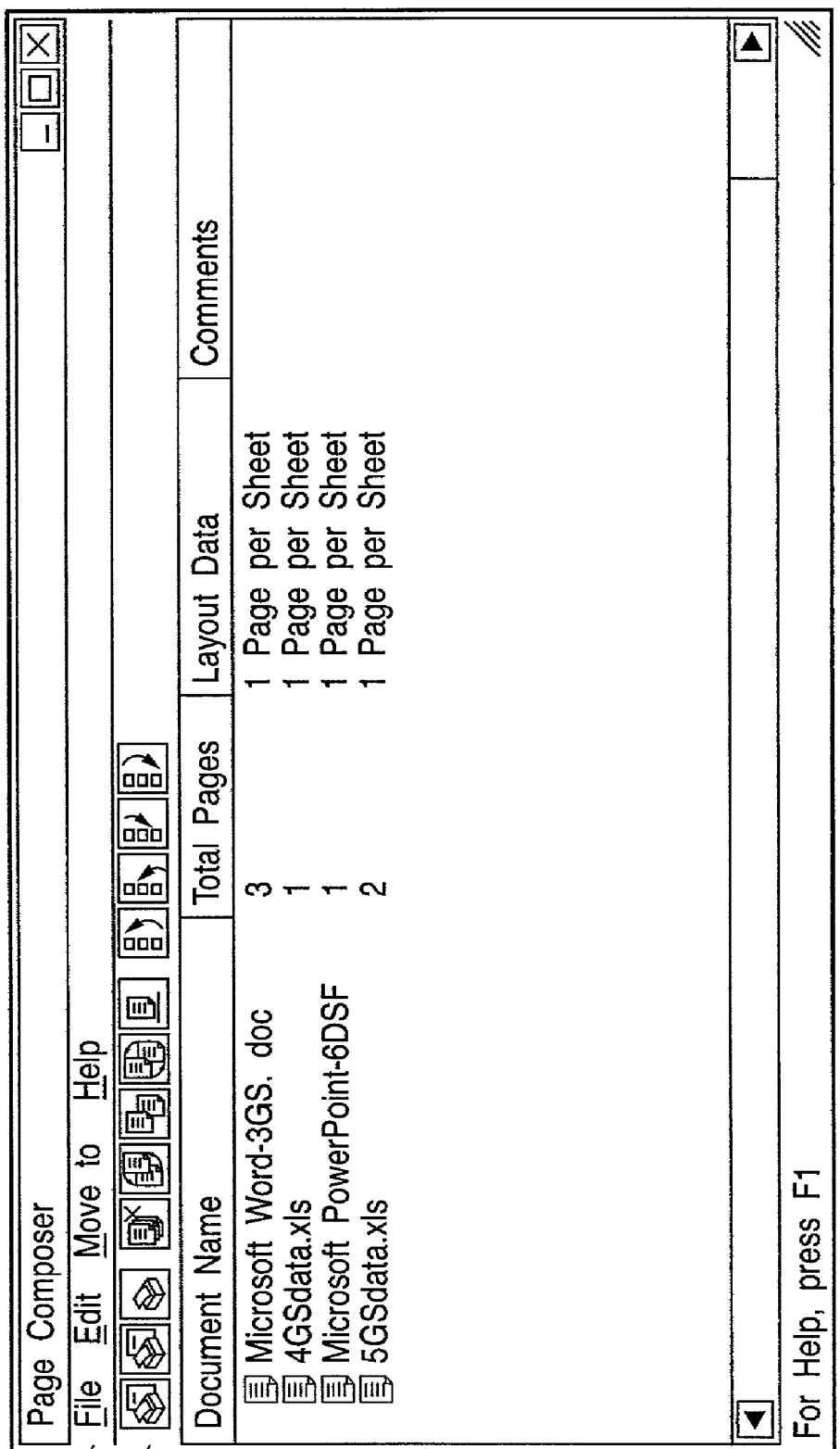
FIG. 16 is a view showing a window of a spool file manager.

As described above, the contents set in the property of the printer driver are stored in a structure provided as a setting file by the OS (for example, the structure called DEVMODE in a Windows OS). In this structure, for example, a setting that indicates whether to store data in the spool file manager 304 is included in the process settings stored in the spool file 303. If the spool file manager 304 reads processing settings through the printer driver, and "store" is designated, a page description file and job setting file are generated and stored in the spool file 303, as described above. As shown in FIG. 16, a window of the spool file manager pops up to display a list of jobs spooled in the spool file 303.

FIG. 16 shows an example of how four jobs are spooled. The jobs can be operated by pressing a menu bar 1601 or menu icons 1602 located immediately below the bar. The number of operations implemented by the menu bar 1601 is equal to that implemented by menu icons 1602. There are 11 types of operations, namely "print" to print while a job is selected; "save and print" to print while saving an intermediate code spool file; "preview" to see an output preview of a job in consideration of print settings; "delete" to delete an intermediate code spool file; "copy" to generate a copy of an intermediate code spool file; "merge" to merge jobs based on a plurality of intermediate code spool files into one job; "divide" to divide a merged job into a plurality of jobs; "job edit" to change print settings (layout setting, finishing setting, and the like) for a single job or merged job; "move to beginning" to set a desired job to the beginning of a printing order, "move upward by one" to move the position of a desired job upward by one in a printing order; "move downward by one" to move the position of a desired job downward by one in a printing order; and "move to end" to move a desired job to the end of a printing order.

If "preview" is designated with respect to a signal job or merged job on the window of the spool file manager shown in FIG. 16, the previewer 306 stored in the external memory 11 is loaded into the RAM 2, and an instruction to perform preview processing for an intermediate code job described in the spool file 303 is given to the previewer 306.

The previewer 306 sequentially reads out intermediate code page description files (PDFs) contained in the spool file 303, processes them in accordance with the process setting information contained in job setting files (SDFs) stored in the spool file 303, and outputs GDI functions to the graphic engine 202. When the graphic engine 202 outputs print data in an client area set in the engine itself, output operation on the window is allowed.

In addition, the graphic engine 202 can perform proper rendering in accordance with a designated output destination. With this operation, like the despooler 305, the previewer 306 can be implemented by the method of processing intermediate codes contained in the spool file 303 in accordance with the contents of process settings contained in the spool file 303 and outputting the resultant data by using the graphic engine 202.

In this manner, process settings set in the printer driver 203 are stored as a job setting file in the spool file 303, the data of a page description file is processed on the basis of the job setting file, and the resultant data is output. This provides the user with a print preview that indicates how the actual print data will be printed or is closest to the data output by the printer in accordance with a case where Nup (the processing of reducing/arranging N logical pages into one physical page and printing the page) is designated, 2 sided printing is designated, bookbinding/printing is designated, or "stamp" is designated.

Note that the preview function provided by conventional application software such as a document generation application is desired to display data on the basis of page settings in the application, and hence print settings in the printer driver 203 are not reflected, and the user cannot be made to recognize a preview of an actual printout.

Figure 17:
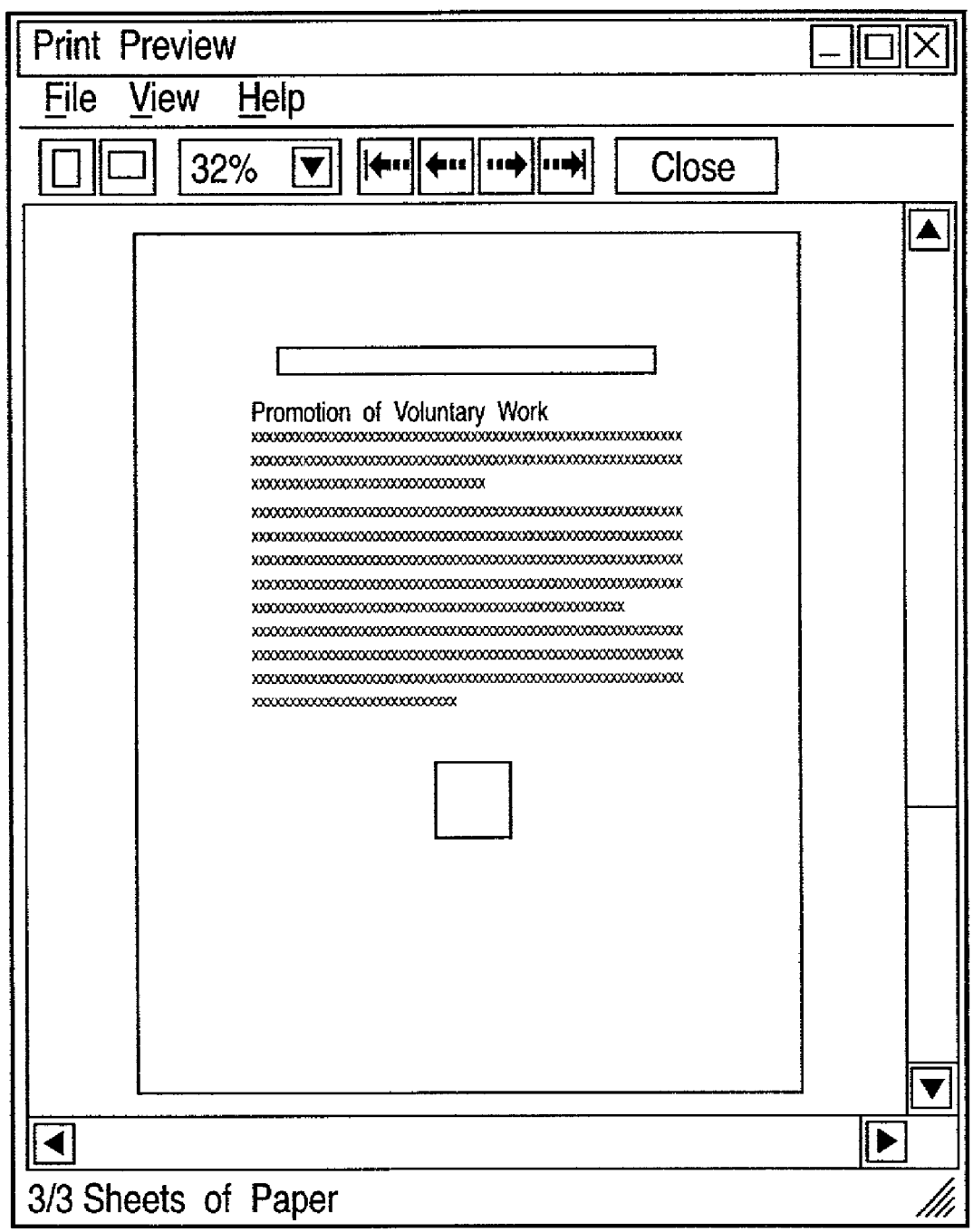
FIG. 17 is a view showing a large preview based on print process settings included in a spool file 303.

By performing preview processing in the above manner, a large preview based on the print settings contained in the spool file 303 is displayed on a window by the previewer 306, as shown in FIG. 17. When the user gives an instruction to stop display, the previewer 306 is closed, and control is transferred to the window of the spool file manager shown in FIG. 16.

When the user is to perform printing in accordance with the contents displayed by the previewer 306, he/she issues a print request by designating "print" or "save and print" on the window of the spool file manager 304. With this operation, the despooler 305 generates a GDI function by processing a page description file on the basis of a job setting file. The print request is sent to the graphic engine 202 and sent to the printer driver 203 through the dispatcher 301, thereby executing print operation.

Setting change operation using the setting change editor 307 will be described next. Like "preview", this operation can be set with respect to a job for which "store" is designated in FIG. 9. With similar processing, the window of the spool file manager 304 pups up to display a list of spooled jobs. When "job edit" is designated and setting change operation is designated on the window of the spool file manager 304, the setting change editor 307 stored in the external memory 11 is loaded into the RAM 2, and an instruction to display current or default process settings is given to the setting change editor 307. A job setting window like the one shown in FIG. 18 is then displayed.

Figure 18:
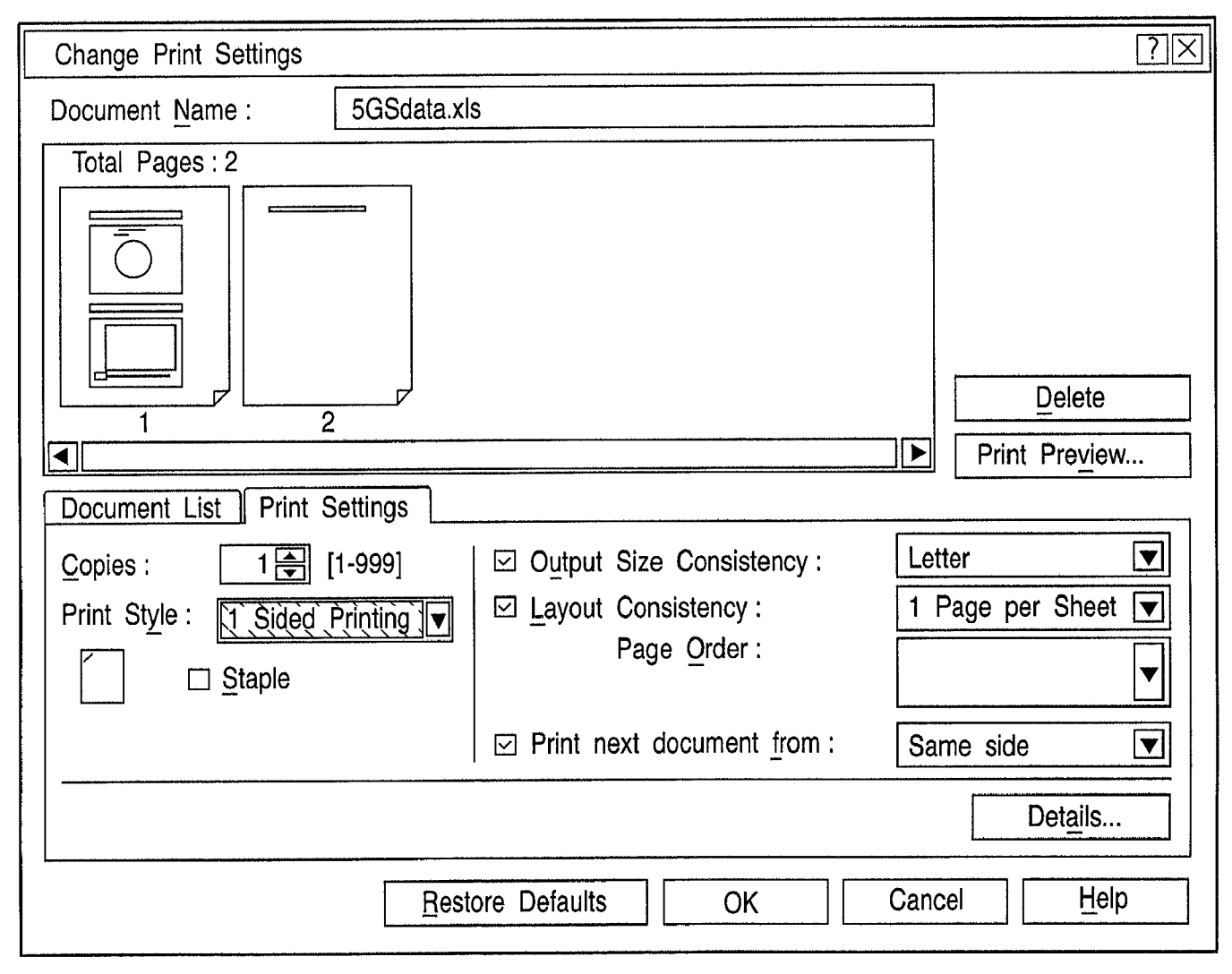

The setting change editor 307 acquires a job setting file for the job for which "job edit" is designated from the spool file 303, and changes the default values on the job setting window shown in FIG. 18 on the basis of the setting items designated in the job setting file. In the example shown in FIG. 18, in the job setting file for the job for which "job edit" is designated, the following are designated: "copies": 1; "print style": 1-sided printing; "staple": no; "layout consistency": 1 page per sheet; and the like.

The setting change editor 307 also processes the intermediate code page description file contained in the spool file 303 in accordance with the contents of the process settings stored in the job setting file stored in the spool file 303, and outputs the resultant data to the client area of the engine itself, thereby outputting a small preview on the window shown in FIG. 18.

Furthermore, in this case, the contents of the process settings stored in the job setting file stored in the spool file 303 can be changed/modified. In this case, the setting change editor 307 may have, on its user interface, items for the printer driver 203 which can be set, or the user interface of the printer driver 203 may be invoked.

As shown in FIG. 18, "copies", "print style" (1 sided printing, 2 sided printing, or bookbinding/printing), "staple" (saddle finisher or the like), "page layout", "page order", and the like can be designated. In addition, when "details" is pressed, most of the items that can be designated by the printer driver can be changed. Assume, however, that the user is not permitted to change settings associated with print quality, e.g., resolution and graphic mode.

With regard to each item changed in this case, the change is authenticated in accordance with an authentication request on the setting change editor 307. Control is then transferred to the spool file manager 304. When a change is authenticated, the changed print setting is stored. However, this setting is not stored in the original job setting file but is stored in a newly generated job output setting file used in job edit operation and the like. The details of a job output setting file will be described later with reference to FIG. 10 and the subsequent drawings.

When the user is to print the data in accordance with the setting change contents upon checking the data on the previewer 306, he/she issues a print request on the spool file manager 304. The print request is sent to the graphic engine 202 and is set to the printer driver 203 through the dispatcher 301, thereby executing print operation.

On the window of the spool file manager 304 shown in FIG. 16, the user can designate the operation of merging a plurality of print jobs and executing them as one print job. Like "preview" and "change print settings", this operation is based on a job for which "store" is designated as an output destination in the property of the printer driver shown in FIG. 9.

In merging print jobs, first of all, the user invokes the printer driver 203 from the application 201, and selects "store" on the user interface shown in FIG. 9. As in the above case, with this selection, the jobs are stored in the spool file 303, and the window of the spool file manager 304 pops up, as shown in FIG. 16. A list of spooled jobs is then displayed on the window of the spool file manager 304. In addition, by performing similar operation from the application 201, a list of a plurality of jobs is displayed on the spool file manager 304.

In this case, if a plurality of jobs are selected and "merge" is designated, the setting change editor 307 stored in the external memory 11 is loaded into the RAM 2, and the setting change editor 307 is given an instruction to display process settings for the first job of a list or default process settings. As a consequence, a merge setting window like the one shown in FIG. 18 is displayed. Although the job setting window of the setting change editor 307 is used as a merge setting window, another module may be used.

The setting change editor 307 processes an intermediate code page description file contained in the spool file 303 in accordance with the contents of process settings contained in job setting information stored in the spool file 303, and outputs all jobs designated as merge jobs to its own client area by using the graphic engine 202, thereby performing output operation on the window. At this time, small previews of all the selected jobs can be displayed in the preview area shown in FIG. 18. In generating a merged job, a job output setting file is generated by extending a job setting file for each single job. This job output setting file is also generated in performing job edition. One such a file is generated for one job, and is also generated for a merged job.

In this case, process settings for the respective jobs can be displayed before merging, or may be displayed after they are changed/modified into uniform process settings for the merged job. In this case, the setting change editor 307 may have, on its user interface, items which can be set, or the user interface of the printer driver 203 may be invoked.

With regard to the merged job and the change items that have been changed, the changes are authenticated in accordance with an authentication request on the setting change editor 307, and control is transferred to the spool file manager 304. With these operations, the plurality of selected jobs are displayed as one merged job on the window of the spool file manager.

When the user is to perform printing in accordance the setting change contents upon checking them on the previewer 306, the user issues a print request on the spool file manager 304. The print request is sent to the graphic engine 202 and is sent to the printer driver 203 through the dispatcher 301, thereby executing printing.

The structure of the printer 1500 according to this embodiment which is designed to print on the basis of a printer control command input from the printer driver 203 through the system spooler 204 will be described next.

Figure 4:
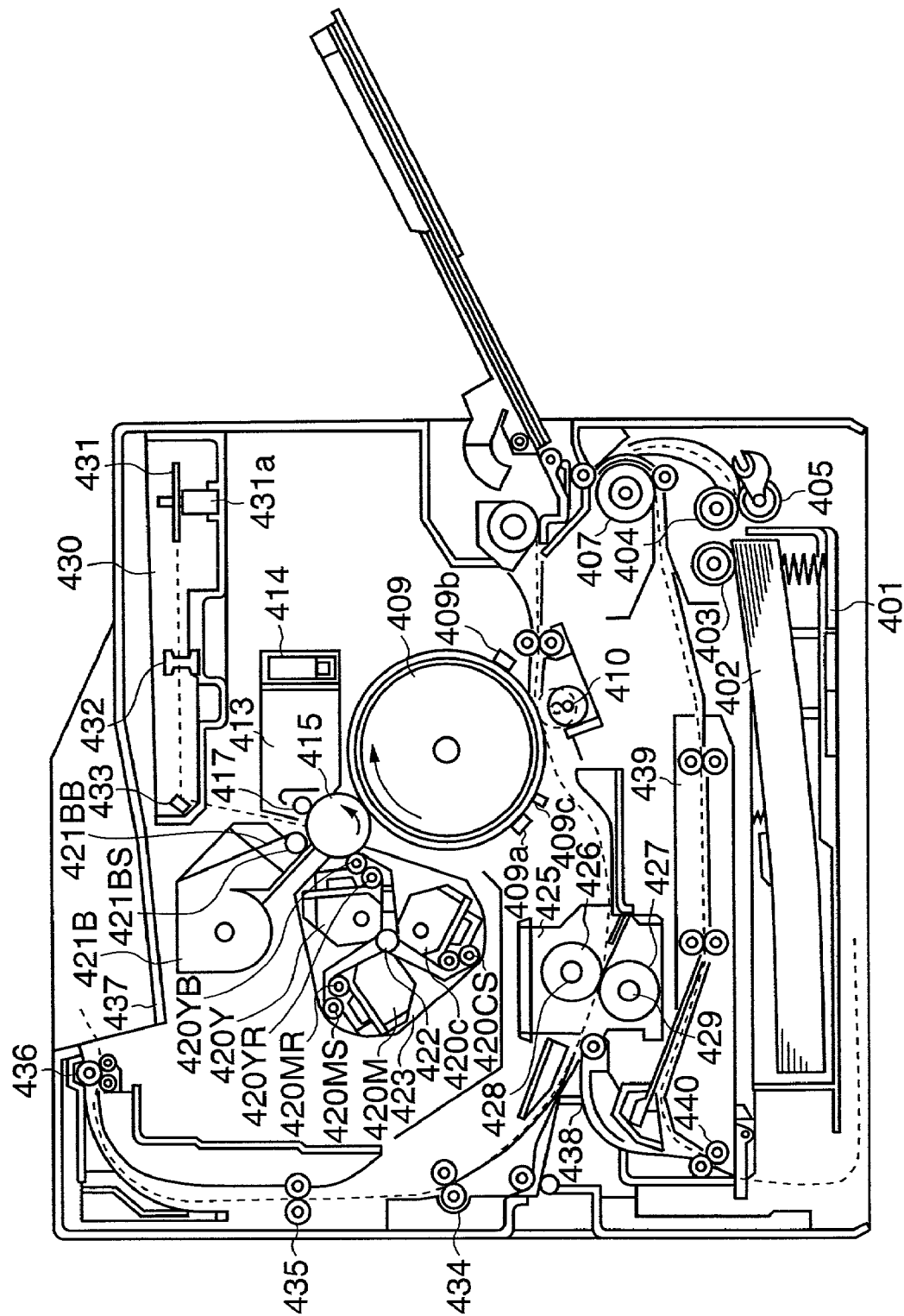
FIG. 4 is a sectional view showing the structure of a printer according to this embodiment.

FIG. 4 is a sectional view showing the structure of the printer according to this embodiment. As an example of the printer 1500, a color laser printer having a 2 sided printing function will be described below.

As shown in FIG. 4, this printer forms an electrostatic latent image by scanning a photosensitive drum 415, via a polygon mirror, with a laser beam modulated in accordance with image data of each color obtained on the basis of print data input from the host computer 3000. The printer then obtains a visible image by toner-developing this electrostatic latent image, and superposes/transfers such visible images of all the colors onto an intermediate transfer member 409, thereby forming a color visible image. Furthermore, the printer transfers this color visible image onto a transfer material 402, and fixes the color visible image on the transfer material 402.

An image forming unit which performs the above control operation is comprised of a drum unit 413 having the photosensitive drum 415, a primary charging unit having a contact charge roller 417, a cleaning unit, a developing unit, the intermediate transfer member 409, a paper feed unit including a paper cassette 401, rollers 403, 404, 405, 407, and the like, and a transfer unit/fixing unit 425 including a transfer roller 410.

The drum unit 413 is integrally constituted by the photosensitive drum (photosensitive member) 415 and a cleaner container 414 having a cleaning mechanism also serving as a holder for the photosensitive drum 415. The drum unit 413 is detachably supported on the printer body and designed to be easily replaced as a unit in accordance with the service life of the photosensitive drum 415. The photosensitive drum 415 is formed by coating the outer surface of an aluminum cylinder with an organic photoconductive layer and rotatably supported by the cleaner container 414. The photosensitive drum 415 is rotated by driving force transferred from a driving motor (not shown). The driving motor rotates the photosensitive drum 415 counterclockwise in accordance with image forming operation. An electrostatic latent image is formed by selectively exposing the surface of the photosensitive drum 415.

In a scanner unit 430, a modulated laser beam is reflected by the polygon mirror 431 which is rotated by a motor 431a in synchronism with a horizontal sync signal of an image signal. The photosensitive drum 415 is then irradiated with this laser beam via a lens 432 and reflecting mirror 433.

In order to visualize the above electrostatic latent image, the developing unit includes three color developer units 420Y, 420M, and 420C for respectively developing yellow (Y), magenta (M), and cyan (C) and one black developer unit 421B for developing black (B). The color developer units 420Y, 420M, and 420C and black developer unit 421B respectively have sleeves 420YS, 420MS, 420CS, and 421BS, and coating blades 420YB, 420MB, 420CB, and 421BB which are respectively in tight contact with the outer surfaces of the sleeves 420YS, 420MS, 420CS, and 421BS. The three color developer units 420Y, 420M, and 420C respectively have coating rollers 420YR, 420MR, and 420CR.

The black developer unit 421B is detachably mounted on the printer body, whereas the color developer units 420Y, 420M, and 420C are detachably mounted on a developing rotary member 423 which rotates about a rotating shaft 422.

The sleeve 421BS of the black developer unit 421B is spaced apart from the photosensitive drum 415 by, for example, a small distance of about 300 μm. The black developer unit 421B feeds toner with a feed member incorporated in the unit, and charges the toner with frictional electrification to coat the outer surface of the sleeve 421BS, which rotates clockwise, with the toner by using the coating blade 421BB. The electrostatic latent image on the photosensitive drum 415 is developed by applying a developing bias to the sleeve 421BS to form a visible black toner image on the photosensitive drum 415.

In image forming operation, the three color developer units 420Y, 420M, and 420C rotate upon rotation of the developing rotary member 423, and the sleeves 420YS, 420MS, and 420CS face the photosensitive drum 415 at a small distance of 300 μm. With this operation, the color developer units 420Y, 420M, and 420C stop at developing positions opposing the photosensitive drum 415 to form visible images on the photosensitive drum 415.

In forming a color image, every time the intermediate transfer member 409 makes one rotation, the developing rotary member 423 rotates, and developing steps are performed in the order of the color developer units 420Y, 420M, and 420C and black developer unit 421B. When the intermediate transfer member 409 makes four rotations, visible yellow, magenta, cyan, and black toner images are sequentially formed. As a consequence, a full-color visible image is formed on the intermediate transfer member 409.

The intermediate transfer member 409 is designed to come into contact with the photosensitive drum 415 and rotate upon rotation of the photosensitive drum 415. In forming a color image, the intermediate transfer member 409 rotates clockwise to undergo superposition/transfer of a visible image from the photosensitive drum 415 four times. In image forming operation, the transfer roller 410 (to be described later) comes into contact with the intermediate transfer member 409 to hold/convey the transfer material 402 so as to simultaneously superpose/transfer the color visible images, formed on the intermediate transfer member 409, onto the transfer material 402. A TOP sensor 409a, RS sensor 409b, and density sensor 409c are arranged around the outer surface of the intermediate transfer member 409. The TOP and RS sensors 409a and 409b detect the position of the intermediate transfer member 409 in the rotating direction. The density sensor 409C detects the density of each toner image transferred onto the intermediate transfer member 409.

The transfer roller 410 includes a transfer charger which is supported such that it can come into contact with and move away from the photo sensitive drum 415. The transfer roller 410 is formed by winding an intermediate-resistance foamed elastic member around a metal shaft. While color visible images are superposed/transferred onto the intermediate transfer member 409, the transfer roller 410 is located below to be separate from the intermediate transfer member 409 as indicated by the solid line in FIG. 4 so as not to disturb the color visible images. After four color visible images are formed on the intermediate transfer member 409, the transfer roller 410 is located above as indicated by the dotted line in FIG. 4 by a cam member (not shown) in accordance with the timing of transfer of the color visible images onto the transfer material 402. With this operation, the transfer roller 410 comes into tight contact with the intermediate transfer member 409 through the transfer material 402 with a predetermined pressing force, and a bias voltage is applied, thereby transferring the color visible image, formed on the intermediate transfer member 409, onto the transfer material 402.

The fixing unit 425 fixes the transferred color visible image while the transfer material 402 is conveyed, and includes a fixing roller 426 for heating the transfer material 402 and a press roller 427 for bringing the transfer material 402 into tight contact with the fixing roller 426. The fixing roller 426 and press roller 427 have hollow structures and incorporate heaters 428 and 429, respectively. The transfer material 402 holding the color visible image is heated and pressed while conveyed by the fixing roller 426 and press roller 427, thereby fixing the toner on the surface.

After the visible image is fixed, the transfer material 402 is discharged to a paper discharge unit 437 by paper discharge rollers 434, 435, and 436, and the image forming operation is ended.

The cleaning unit cleans residual toner on the photosensitive drum 415 and intermediate transfer member 409. Waste toner that is left on the photosensitive drum 415 after visible toner images formed on the photosensitive drum 415 are transferred onto the intermediate transfer member 409 and waste toner that is left on the intermediate transfer member 409 after four color visible images formed on the intermediate transfer member 409 are transferred onto the transfer material 402 are stored in the cleaner container 414.

The transfer material (printing sheet) 402 used for printing is picked up from the paper feed tray 401 by the feed roller 403 and conveyed while clamped between the intermediate transfer member 409 and the transfer roller 410. As a consequence, color toner images are printed on the transfer material 402. The toner images are fixed when the transfer material 402 passes through the fixing unit 425. In 1 sided printing, a guide 438 forms a convey path to guide a printing sheet to the paper discharge unit 437 located above. In 2 sided printing, the guide 438 forms a path to guide a printing sheet to a 2 sided unit located below.

The printing sheet guided to the 2 sided unit is temporarily conveyed to a portion (the convey path indicated by the chain double-dashed line) below the paper feed tray 401 and then conveyed in the opposite direction to be sent to a 2 sided tray 439. On the 2 sided tray 439, the sheet is turned over and reversed in the convey direction with respect to the state of the sheet on the paper feed tray 401. By transferring and fixing toner images again in this state, 2 sided printing can be done.

A generation process in the spooler 302 will be described below, in which the spooler 302 receives a print request from the application 201 through the graphic engine 202 and dispatcher 301, analyzes the print request, and converts the request into intermediate codes on a page basis, thereby generating a spool file.

Figure 5:
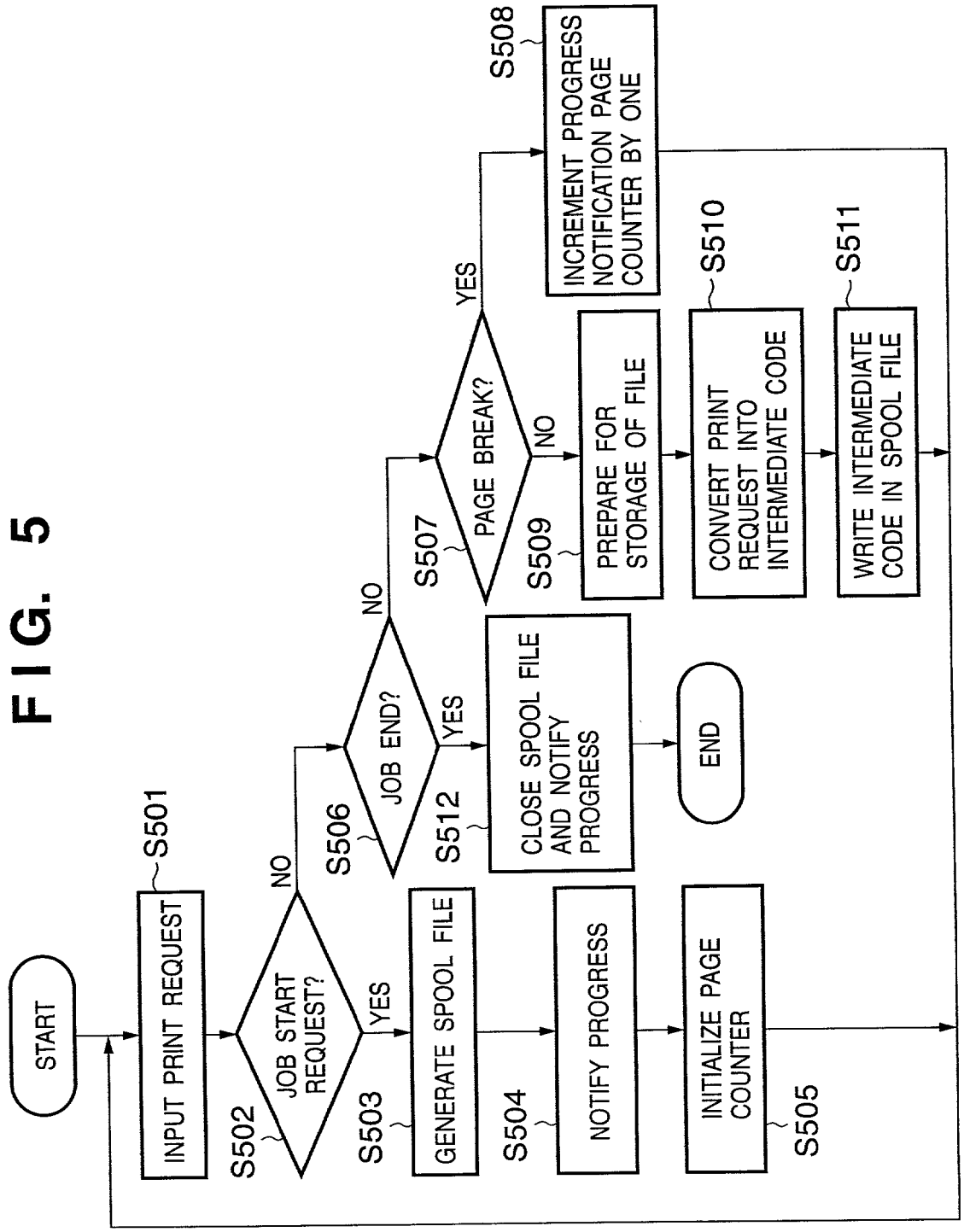
FIG. 5 is a flow chart showing a generation process executed by a spooler 302.

FIG. 5 is a flow chart showing the generation process in the spooler 302. In step S501, the spooler 302 receives a print request from the application 201 through the graphic engine 202 and dispatcher 301. The application 201 displays a dialog like the one shown in FIG. 8 which is used to input print settings. Print settings input through this dialog are transferred to the spooler 302 through the printer driver 203. The setting input dialog shown in FIG. 8 includes a setting item for determining the number of logical pages to be laid out in one physical page denoted by reference numeral 801 and the like.

In step S502, the spooler 302 checks whether the received print request is a job start request. If the spooler 302 determines that the request is a job start request, the flow advances to step S503, in which the spooler 302 generates the spool file 303 for temporarily storing intermediate data. In step S504, the spooler 302 notifies the spool file manager 304 of the progress of print processing. In step S505, the page counter of the spooler 302 is initialized to "1". In this case, the spool file manager 304 reads, from the spool file 303, job setting information, process settings, and the like for the job for which printing is started, and stores the read information.

If it is determined in step S502 that the request is not a job start request, the flow advances to step S506, in which the spooler 302 checks whether the received request is a job end request. If it is determined that the request is not a job end request, the flow advances to step S507 to check whether the request is a page break request. If it is determined in step S507 that the request is a page break request, the flow advances to step S508 to notify the spool file manager 304 of the progress of print processing. The page counter is then incremented, the page description file storing an intermediate code is closed, and the next page description file is generated.

If it is determined in step S507 that the received print request is not a page break request, the flow advances to step S509, in which the spooler 302 makes a preparation for writing of an intermediate code in the page description file.

In step S510, to store the print request in the spool file 303, the spooler 302 converts the DDI function of the print request into an intermediate code. In step S511, the spooler 302 writes the print request (intermediate code), which is converted into the form that can be stored in step S510, in the page description file of the spool file 303. The flow then returns to step S501 to receive a print request from the application 201 again.

This series of operations from step S501 to step S511 is continued until a job end request (End Doc) is received from the application 201. At the same time, the spooler 302 acquires information such as process settings stored in the DEVMODE structure from the printer driver 203, and stores the information as a job setting file in the spool file 303. If it is determined in step S506 that the print request from the application 201 is a job end request, since all print requests from the application are completed, the flow advances to step S512 to notify the spool file manager 304 of the progress of print processing, thereby terminating the processing.

A process will be described next, in which the spool file manager 304 receives a progress notification from the spooler 302 or despooler 305 and controls the generation process executed by the spooler 302 and the print data generation process executed by the despooler 305 (to be described later).

Figure 6:
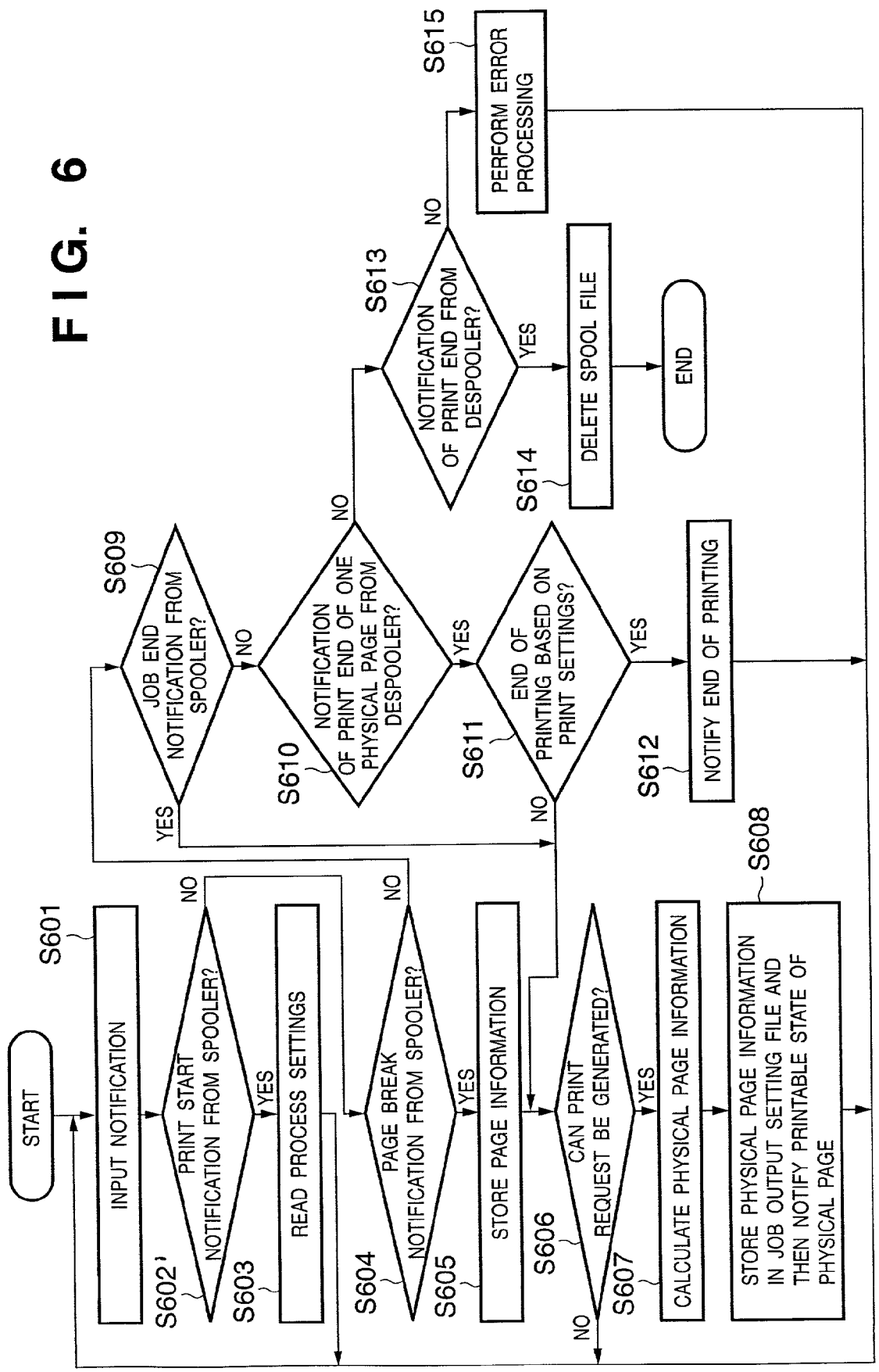
FIG. 6 is a flow chart showing control performed by a spool file manager 304.

FIG. 6 is a flow chart showing control operation performed by the spool file manager 304. In step S601, the spool file manager 304 receives a progress notification about print processing from the spooler 302 or despooler 305. In step S602, the spool file manager 304 checks whether the progress notification is the print start notification made by the spooler 302 in step S504 in FIG. 5. If it is determined that the notification is the print start notification from the spooler 302, the flow advances to step S603 to read print process settings from the spool file 303 and start job management.

If it is determined in step S602 that the notification is not the print start notification from the spooler 302, the flow advances to step S604, in which the spool file manager 304 checks whether the progress notification is the print end (page break) notification about 1 logical page which is made by the spooler 302 in step S508 in FIG. 5. If it is determined that the notification is the print end notification about 1 logical page, the flow advances to step S605 to store logical page information about this logical page. In step S606, it is checked whether printing of 1 physical page on n logical pages after spooling can be started. If YES in step S606, the flow advances to step S607 to determine a physical page number from the number of logical pages allocated to 1 physical page to be printed.

Figure 8:
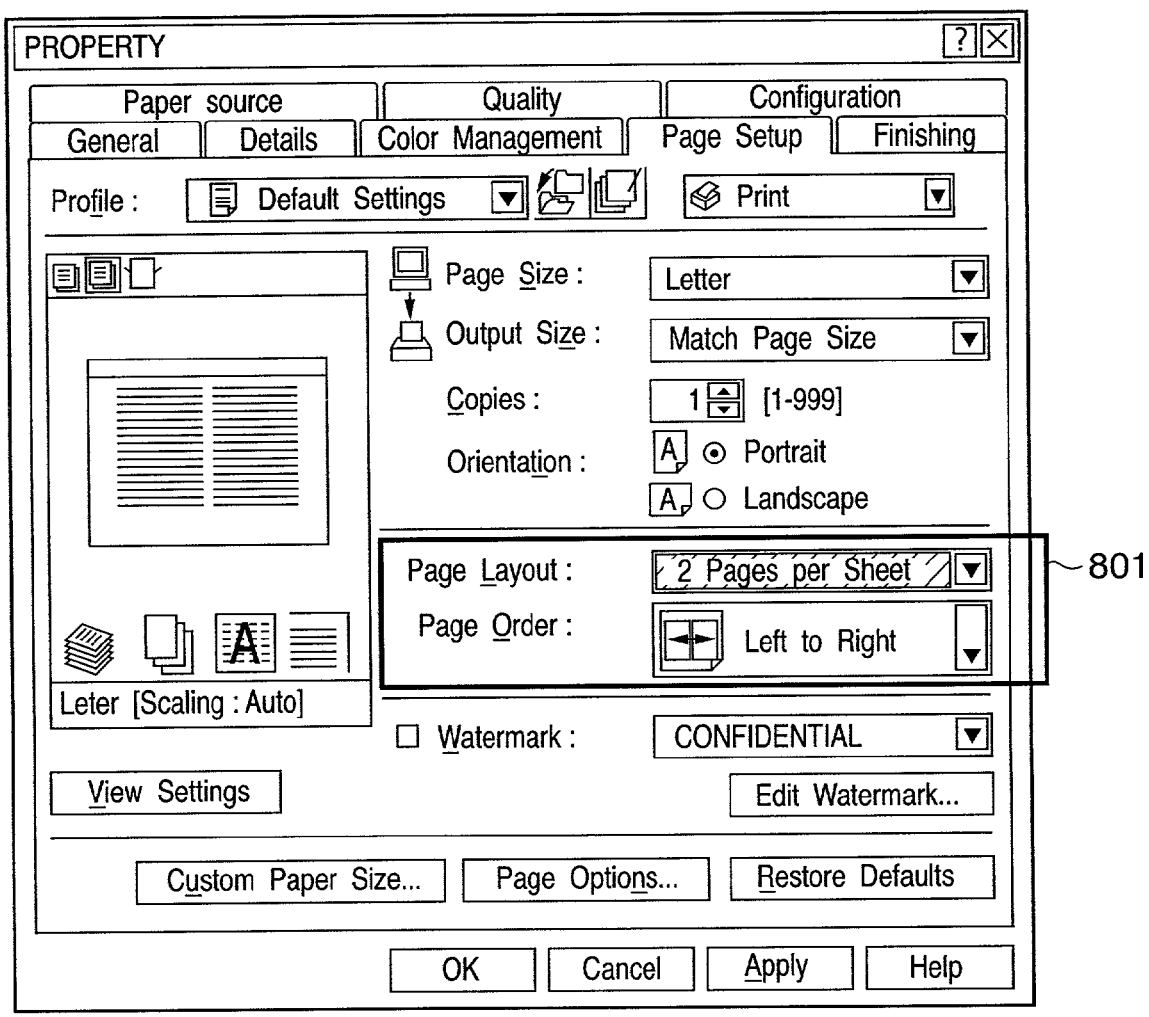
FIG. 8 is a view showing a dialog for inputting print settings.

This physical page calculation is performed as follows. If, for example, process settings are made to arrange 4 logical pages in 1 physical page as shown in FIG. 8, the first physical page can be printed when the fourth logical page is spooled. As a consequence, the first physical page is calculated. Likewise, the second physical page can be printed when the eighth logical page is spooled.

Note that even if the sum total of logical pages is not a multiple of the number of logical pages arranged in 1 physical page, the number of logical pages to be arranged in 1 physical page can be determined by making a spool end notification in step S512 in FIG. 5.

In step S608, pieces of information such as logical page numbers constituting each physical page that can be printed, and each physical page number are stored in the form shown in FIG. 10 in a job output setting file (a file containing physical page information), and the despooler 305 is notified that physical page information corresponding to one physical page is added. The flow then returns to step S601 to wait for the next notification. Note that this job output setting file will be further described with reference to FIG. 10.

As described above, in this embodiment, even if all print jobs are not completely spooled when 1-page print data, i.e., logical pages constituting 1 physical page, are spooled, print processing can be performed.

If it is determined in step S604 that the progress notification is not a print end notification about 1 physical page from the spooler 302, the flow advances to step S609, in which the spool file manager 304 checks whether the notification is the job end notification made by the spooler 302 in step S512 in FIG. 5. If it is determined that the notification is the job end notification, the flow advances to step S606. If it is determined that the notification is not the job end notification, the flow advances to step S610, in which the spool file manager 304 checks whether the received notification is a print end notification about 1 physical page from the despooler 305. If it is determined that the notification is a print end notification about 1 physical page, the flow advances to step S611 to check whether all pages based on process settings are printed. If YES in step S611, the flow advances to step S612 to notify the despooler 305 of the end of printing. If it is determined in step S611 that not all pages based on the process settings are printed, the flow advances to step S606.

Note that the despooler 305 in this embodiment operates on the assumption that print processing is performed on a physical page basis. In step S608, information necessary for print processing for 1 physical page is sequentially stored in a file to be reused. If, however, such information need not be reused, information may be sequentially overwritten on a physical page basis by using a high-speed medium such as a shared memory, thus increasing the speed and saving the resources. Assume that the progress of processing in the despooler 305 is faster than that in the spooler 302, or the despooler 305 is activated after all pages are spooled. In this case, the number of times of notification can be saved by notifying that a plurality of physical pages or all physical pages can be printed, in accordance with the progress on the despooler 305 side, instead of notifying, on a physical page, in step S608 that printing can be performed.

If it is determined in step S610 that the notification is not the print end notification about 1 physical page from the despooler 305, the flow advances to step S613, in which the spool file manager 304 checks whether the notification is a print end notification from the despooler 305. If it is determined that the notification is a print end notification from the despooler 305, the flow advances to step S614, in which the spool file manager 304 deletes the corresponding page description file in the spool file 303 and terminates this processing. If it is determined in step S613 that the notification is not a print end notification from the despooler 305, the flow advances step S615 to perform other normal processing (e.g., error processing) and wait for the next notification.

A print data generation process will be described next, in which the despooler 305 reads out necessary information (a page description file, job setting file, and the like) from the spool file 303 in accordance with a print request from the spool file manager 304, and generates print data. Note that the method of transferring generated print data to the printer 1500 has already been described with reference to FIG. 3.

Figure 7:
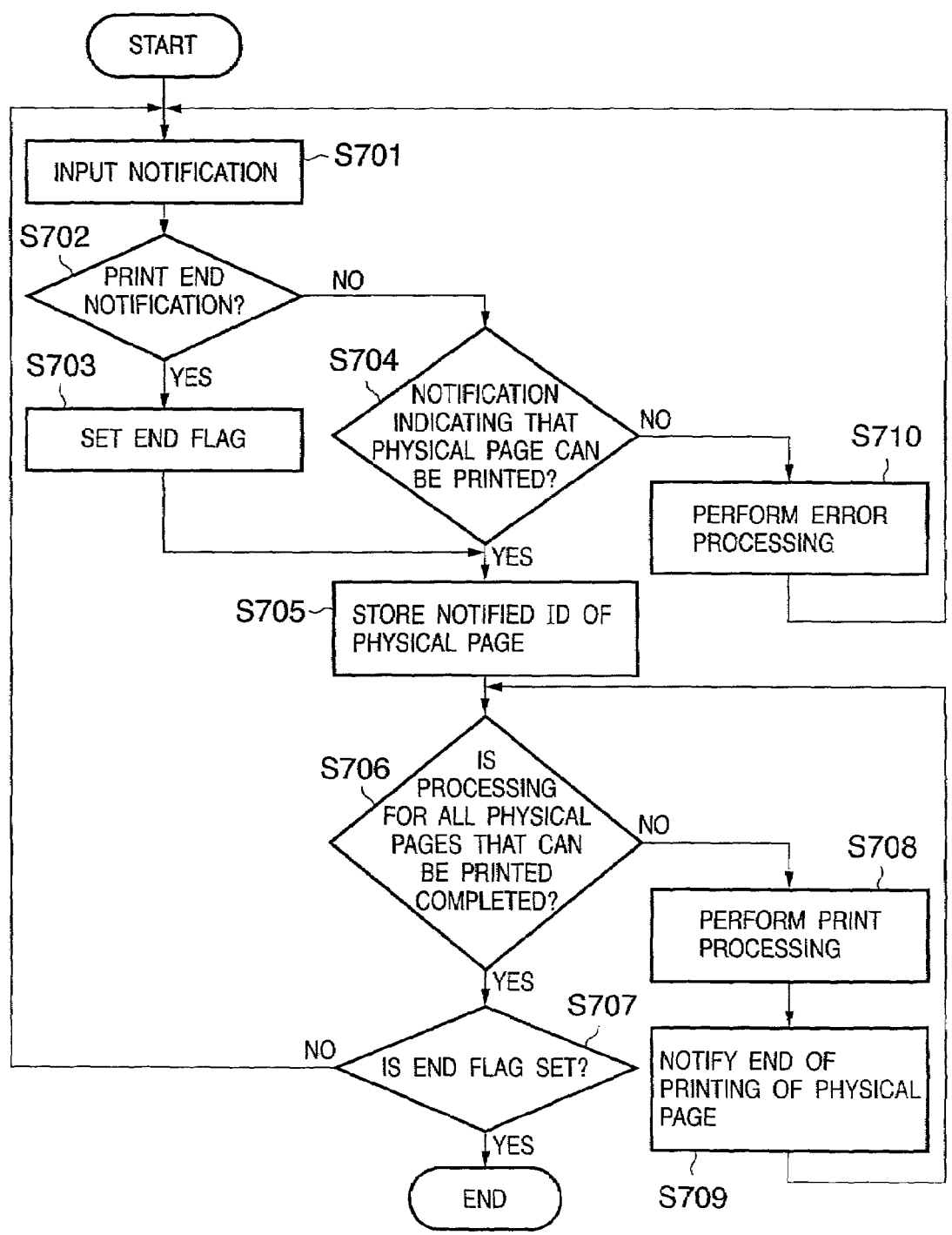
FIG. 7 is a flow chart showing a print data generation process executed by a despooler 305.

FIG. 7 is a flow chart showing the print data generation process in the despooler 305. In step S701, the despooler 305 receives a notification from the spool file manager 304 described above. In step S702, the despooler 305 checks whether the input notification is a job end notification. If it is determined that the notification is a job end notification, the flow advances to step S703 to set an end flag. The flow then advances to step S705.

If it is determined in step S702 that the notification is not a job end notification, the flow advances to step S704 to check whether the notification is the print start request for 1 physical page that is notified in step S608 in FIG. 6. If it is determined that the notification is not the print start request, the flow advances to step S710 to perform other processing (error processing). The flow then returns to step S701 to wait for the next notification. If it is determined in step S704 that the notification is the print start request for 1 physical page, the flow advances to step S705, in which the despooler 305 stores the ID of a physical page that can be printed and is notified. In step S706, the despooler 305 checks whether print processing for all pages corresponding to the physical page IDs stored in step S705 is completed. If YES in step S706, the flow advances to step S707 to check whether an end flag is set instep S703 described above. If it is determined that an end flag is set, it is determined that the job is ended. The despooler 305 then notifies the spool file manager 304 of the end of processing, and terminates this processing. If it is determined in step S707 that an end flag is not set, the flow returns to step S701 to wait for the next notification.

If it is determined in step S706 that physical pages that can be printed are left, the flow advances to step S708, in which the despooler 305 sequentially reads out physical page IDs which are not processed from the stored physical page IDs.

The despooler 305 then reads information necessary for the generation of print data of physical pages corresponding to the read physical page IDs, and performs print processing. In this print processing, the despooler 305 converts each print request instruction stored in the spool file 303 into a form (GDI function) that can be recognized by the graphic engine 202, and transfers it.

When process settings are made to lay out a plurality of logical pages in 1 physical page (to be referred to as "N page printing" hereinafter), conversion is performed in consideration a reduced page layout in step S708. When necessary print processing is completed, the despooler 305 notifies the spool file manager 304 of the end of generation of print data corresponding to 1 physical page in step S709. The flow returns to step S706 again to repeat print processing for all the physical page IDs that can be printed and are stored in step S705.

When the dispatcher 301, spooler 302, spool file manager 304, and despooler 305 perform print processing in the above manner, the application 201 is released from the print processing at the timing when the spooler 302 generates intermediate codes and stores them in the spool file 303. This makes it possible to shorten the processing time as compared with conventional print processing in which an intermediate code is directly output to the printer driver 203.

In addition, since intermediate codes are temporarily stored, in the spool file 303, as an intermediate file (a page description file and job setting file) based on the print settings in the printer driver, a print preview of data to be actually printed can be recognized by the user and print jobs generated by a plurality of applications 201 can be merged or rearranged. In addition, the user can change print settings without printing out by activating the application 201 again.

In print processing performed by using the spooler 302, the despooler 305 generates a job output setting file when a print request is issued to the graphic engine 202. When preview operation, job merging, or the like is performed, a job output setting file is generated. This job output setting file is equivalent to a job setting file in the case of a single job, and is generated on the basis of pieces of job setting information in the case of job merging.

A job output setting file in this embodiment will be described below.

FIG. 10 shows an example of a job output setting file in this embodiment. This job output setting file stores information that forms a physical page that can be printed and is generated by the spool file manager 304 in step S608 in FIG. 6. Referring to FIG. 10, an ID for identifying a job is stored in a field 1001. This ID can be stored in the form of a file name in which this information is stored or the name of a shared memory. Job setting information is stored in a field 1002. This job setting information includes information that can only be set in a one-to-one relationship with a job, e.g., designation of a structure necessary for the start of printing of the job with respect to the graphic engine 202, designation of N page printing, designation of additional printing of a page frame or the like, designation of the number of copies, designation of finishing such as "staple". In this job setting information, information is stored as required in accordance with functions for the job.

The number of physical pages of the job is stored in a field 1003. This field indicates that physical page information is stored in the subsequent fields by an amount corresponding to this number. Since this embodiment uses the scheme of notifying the number of physical pages that can be printed, the embodiment can operate without this field. After this field, physical page information is stored from a field 1004 to the last field by an amount corresponding to the number stored in the field 1003. This physical page information will be further described later with reference to FIG. 12.

FIG. 11 shows an example of the job setting information in the field 1002 in FIG. 10. Referring to FIG. 11, the total number of physical pages is stored in a field 1101, and the total number of logical pages is stored in a field 1102. For example, the information in the fields 1101 and 1102 can be added to print data to print the number of pages as additional information. During printing, provisional values are set in the two fields or the spool file manager 304 postpones generating information about printable physical pages until the end of printing. Copy information for designating the number of sets of copies to be printed by the print job is stored in a field 1103. If the information in the field 1103 indicates that a plurality of sets of copies are printed, information indicating whether printing is performed on a set basis is stored in a field 1104. Finishing information such as "staple", "punch", or "Z fold" is stored in a field 1105. This information is designated when a finisher is prepared inside or outside the printer body. An ornament such as a page frame, additional information such as a date, and information such as a user name, the number of pages, or watermark printing which is to be added to a job, is stored in a field 1106. Note that as the number of functions increases, the number of fields contained in this job setting information increases. For example, in the case of 2 sided printing, a field for storing designation of 2 sided printing is added.

Figure 12:
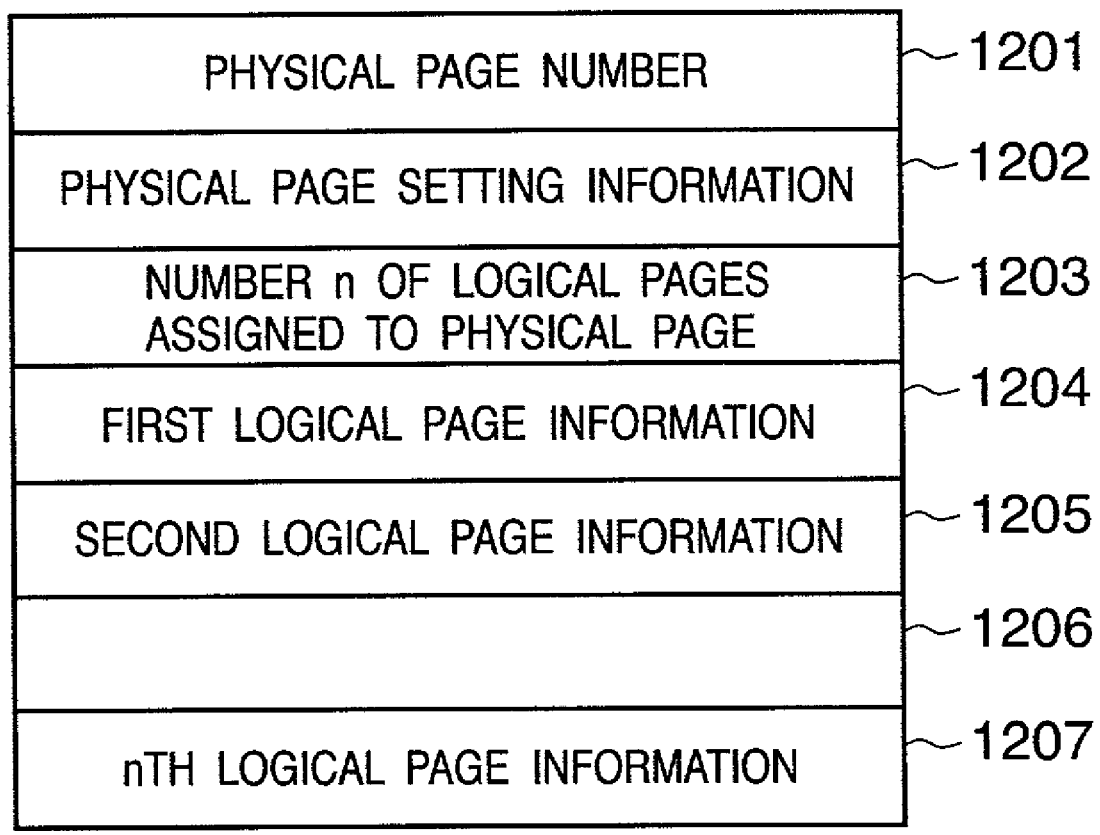
FIG. 12 is a view showing an example of physical page information in a field 1004 in FIG. 10.

FIG. 12 shows an example of the physical page information in the field 1004 shown in FIG. 10. Referring to FIG. 12, a physical page number is stored in a first field 1201, in which a value used for management of a printing order or additionally printing the physical page number is stored. Physical page setting information is stored in a field 1202. If a layout or color/monochrome printing can be designated for each physical page, a layout setting or color/monochrome setting is stored in this field. The number of logical pages to be allocated to a physical page is stored in a field 1203. If four pages are to be allocated to one physical page, an ID indicating "four" or four-page printing is stored in this field. In a field 1204 and the subsequent fields, information of logical pages is stored by an amount corresponding to the number designated in the field 1203.

Note that the number of actual page data may be smaller than the number of pages designated in the field 1203 depending on the number of pages printed from the application 201. In this case, special data indicating an empty page is stored as logical page information.

FIG. 13 shows an example of the physical page setting information in the field 1203 shown in FIG. 12. Referring to FIG. 13, the page order of logical pages on a physical page is stored in a field 1301, in which designation of the page order (from upper left to upper right, from upper left to bottom, or the like) of logical pages on a physical page in N page printing is stored. Depending on the system, the order of logical page information in the field 1204 and the subsequent fields may be set in accordance with the page order instead of the page number order to substitute for the setting in the field 1301. Information indicating the upper or lower surface in 2 sided printing is stored in a field 1302. For example, this information is used to align binding margins on the upper and lower surfaces. Designation of a color page or monochrome page is stored in a field 1303. When the printer has monochrome and color modes, this information is used to print a color page in the color mode and a monochrome page in the monochrome mode. With this information, a color printer can change processing for each page in the automatic color mode. That is, transfer control for a color page can be done by rotating the intermediate transfer member (intermediate transfer drum or intermediate transfer belt) or a transfer member (transfer drum or transfer belt) by the number of rotations corresponding to the number of device colors, e.g., four rotations for YMCK, whereas transfer control for a monochrome pate can be done by rotating it by one rotation for black alone. Additional print information is stored in a field 1304. This information is used to print additional information such as the number of pages and a date. For this physical page setting information, fields are added in accordance with the functions of a system.

Figure 14:
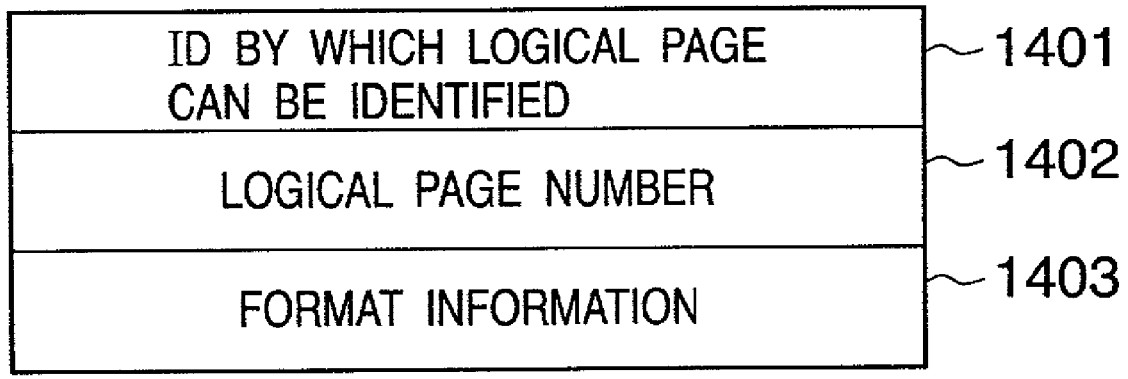
FIG. 14 is a view showing an example of logical page information in a field 1204 in FIG. 12.

FIG. 14 shows an example of the logical page information in the field 1204 shown in FIG. 12. Referring to FIG. 14, the ID of a logical page is stored in a field 1401. This ID is used to refer to the intermediate code of a page description file corresponding to the logical page from the spool file 303. This ID may be a file or memory pointer or may include an intermediate code constituting the logical page as long as the use of the ID allows access to the intermediate code. A logical page number is stored in a field 1402, which is used when the logical page number is printed as additional information or used for auxiliary information for the logical page ID. Format information is stored in a field 1403, in which various setting items that can be designated on a logical page basis are stored. For example, additional print information such as a page frame and information of various settings designated on a logical page basis, e.g., reduction ratio, are stored. Attribute information about a logical page, e.g., color/monochrome information on a logical page basis, can also be stored, as needed. In contrast to this, the field 1403 is not required in a system which need not change settings on a logical page basis or have attribute information on a logical page basis.

A job output setting file is formed in the above manner. A job setting file has almost the same arrangement, which has, as a job, a print style (1 sided printing, 2 sided printing, or bookbinding/printing), print layout (Nup or poster printing), additional information (watermark, date, or user name), the number of copies, and paper size information, and is constituted by information indicating the page order of logical pages, information indicating the upper or lower surface of a printing sheet in 2 sided printing, information indicating the color mode or the like, and the like for each physical page.

A process for implementing a job setting change function by the setting change editor 307 shown in FIG. 3 will be described below, in addition to the extended system described so far. According to this embodiment, in the case of a single job, the setting contents of the job are contained in a job setting file. In the case of a merged job, the contents are contained in the job output setting file shown in FIG. 10, which is independent of the spool file 303 storing intermediate codes. For this reason, settings for the job can be changed by remaking the job output setting file. The setting change editor 307 remakes the job output setting file or rewrites part of the file by itself or in cooperation with the spool file manager 304, thereby implementing the job setting change function.

Figure 15:
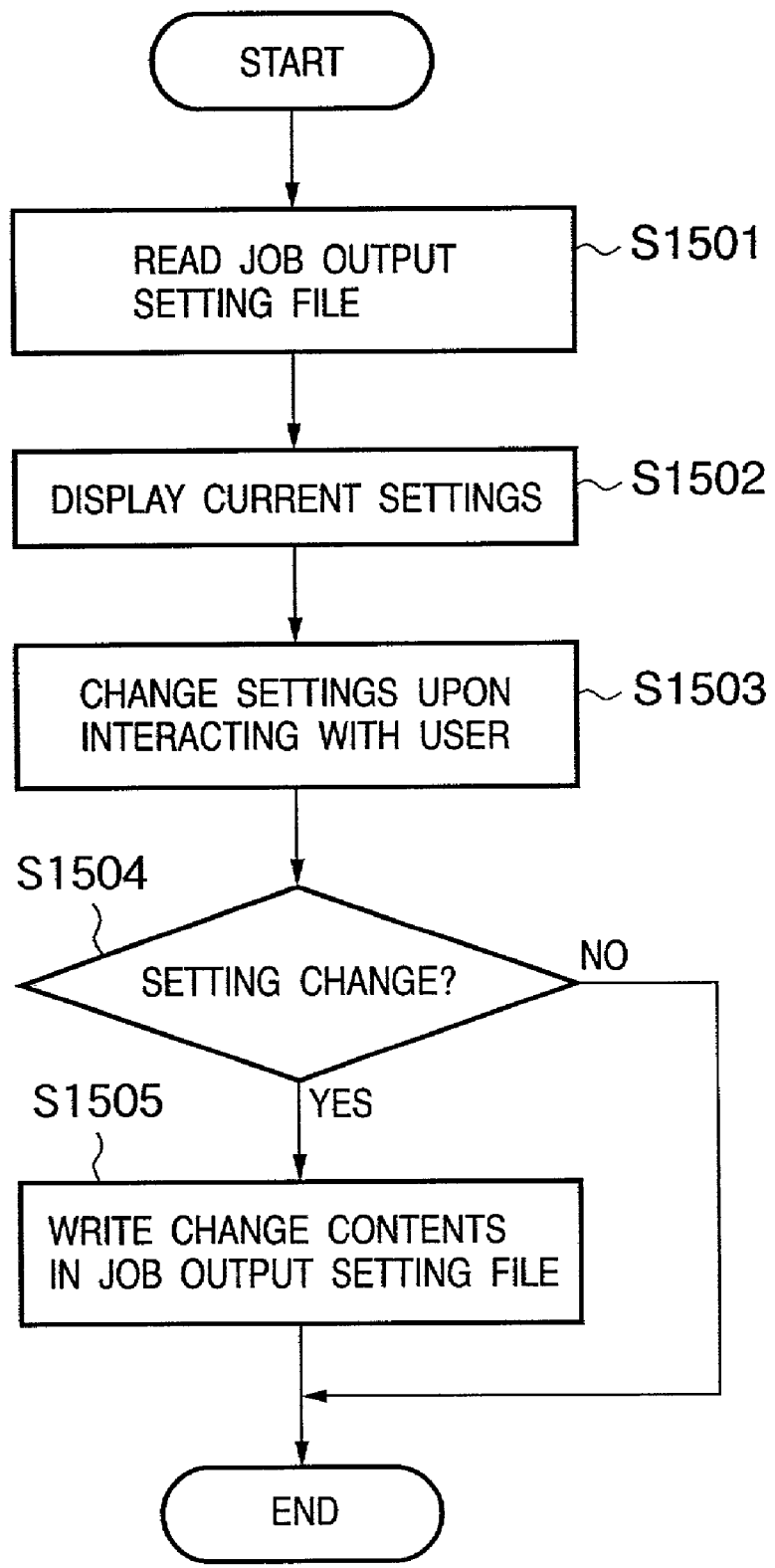
FIG. 15 is a flow chart showing a job setting change process executed by a setting change editor 307.

FIG. 15 is a flow chart showing the job setting change process executed by the setting change editor 307. In step S1501, the setting change editor 307 reads a job setting file or job output setting file. The job output setting file is the same file as that read by the previewer 306 and despooler 305. In step S1502, the contents of the read file are displayed to the user. In step S1503, an interaction with the user is conducted on a user interface like the one shown in FIG. 18 to change the setting contents by the above menu designation and the like. This step may be performed in a batch form in which a change is made in accordance with the setting change contents written in a file or the like instead of an interactive form.

In step S1504, the setting change editor 307 compares the setting contents read first in step S1501 with the current setting contents to check whether the setting contents are changed. If the setting contents are changed, the flow advances to step S1505 to generate a new job output setting file and notify the spool file manager 304 that the setting contents are changed. The processing is then terminated. If it is determined in step S1504 that the setting contents are not changed, the setting change editor 307 notifies the spool file manager 304 that the setting contents are not changed. The processing is then terminated.

In this manner, a new job output setting file is generated. If the user selects the "OK" button on the user interface window shown in FIG. 18, the new job output setting file is validated, and the old job output setting file is deleted. If setting contents are changed not by a job output setting file but by a job setting file in the case of a single job, the old job output setting file is not deleted but stored. In addition, if the user selects "restore defaults" button on the user interface window shown in FIG. 18, the old job output setting file is validated, and the corresponding data is reflected in the display.

In this embodiment, the setting change editor 307 is described as a discrete module. However, the setting change editor 307 may be part of the user interface of the spool file manager 304. Alternatively, the setting change editor 307 may not actually write any change contents in a job output setting file, but only the setting change contents may be notified to the spool file manager 304 to actually change the job output setting file on the spool file manager 304 side.

An extension to be made in the conventional extended system, which is designed to merge a plurality of print jobs to print them as one print job, to make a despool preview of a merged job will be described next.

In general, the spool file 303 in the intermediate code form is generated on a job basis. In the case of a single job, processing is performed by sequentially reading the intermediate codes of each logical page in a target job file. Therefore, the logical page ID in the field 1401 can be realized by a relative or absolute offset indicating the location of each logical page in the file. In the case of a merged job, the spool file 303 and page information belonging to the job must be specified from the job ID in the field 1401. This embodiment uses a scheme of specifying the spool file 303 by adding an ID for identifying the spool file 303 to a logical page ID. In this case, it suffices if only the information in the field 1401 is mainly changed. This is because, if the spool file 303 can be identified, a page portion can be read by the same logic as that for a single job. In addition, if the spool file 303 is stored in a different file form for each logical page, the file name of each logical page may be set as the logical page ID in the field 1401.

Processing will be described next, in which the surface of a printing sheet is segmented into a plurality of areas as in the case of a four-postcard sheet on which four postcards are arranged in a 2×2 matrix, and the layout of print data in the respective segmented areas is controlled.

Figure 19:
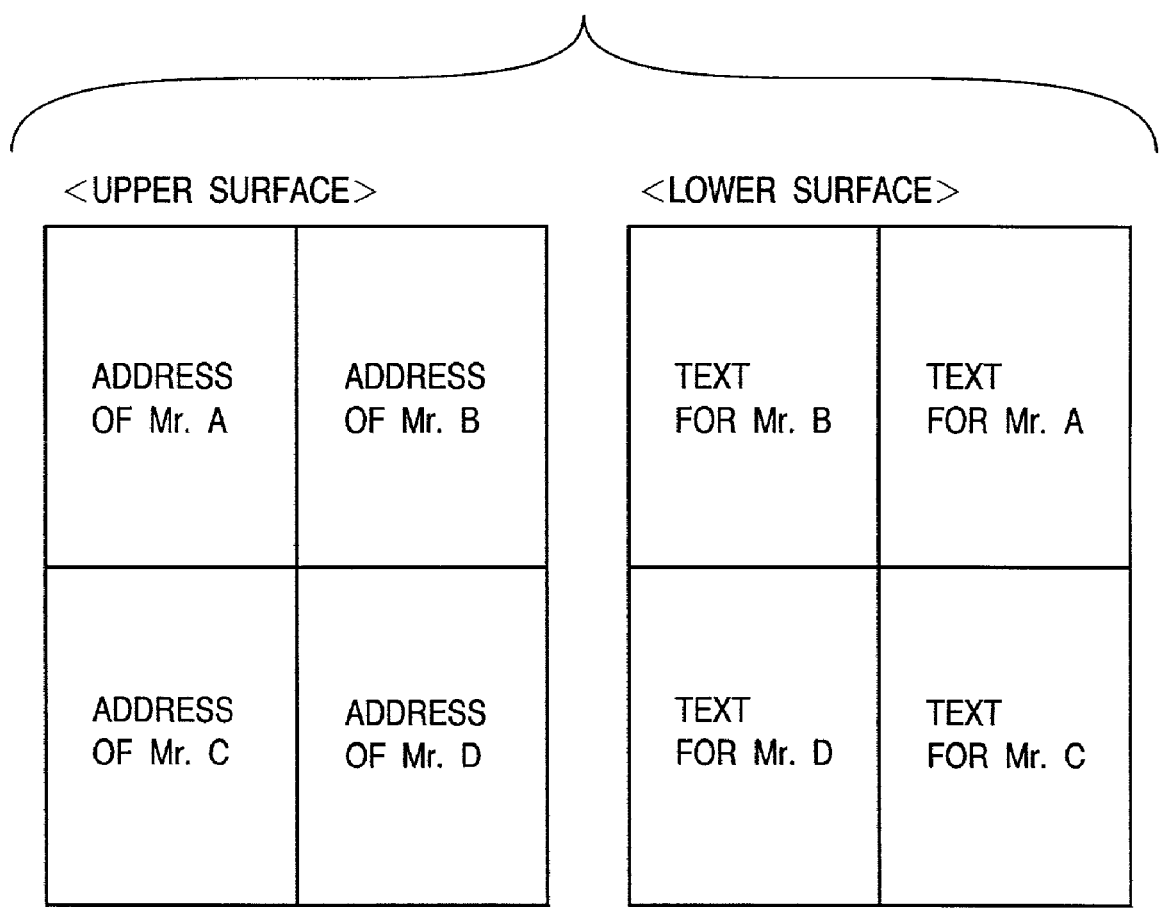
FIG. 19 is a view showing the layouts of upper- and lower-surface data of a four-postcard sheet in this embodiment.

FIG. 19 shows the layouts of the upper and lower surfaces of a four-postcard sheet in this embodiment. As shown in FIG. 19, a four-postcard sheet has four postcards arranged in a 2×2 matrix. If the addresses of Mr. A, Mr. B, Mr. C, and Mr. D are respectively printed on the upper left portion, upper right portion, lower left portion, and lower right portion of the upper surface of the sheet, the text surfaces for Mr. B, Mr. A, Mr. D, and Mr. C are respectively arranged on the upper left portion, upper right portion, lower left portion, and lower right portion of the lower surface. That is, the addresses and texts must be laterally reversed on the upper and lower surfaces of the sheet.

When, therefore, the application 201 is to use a four-postcard sheet in sequentially printing address surface 1, text surface 1, address surface 2, text surface 2, . . . in the order named, data about the first four persons are printed on the address surfaces, respectively, and then the lower-surface data of the four persons are printed. In this case, the page order must be changed to laterally reverse the layout on the upper surface with respect to the layout on the lower surface. Even when data are to be separately printed on the upper or lower surfaces by 1 sided printing, the page order must be changed to match a set of data on the upper surface with a set of data on the lower surface.

Figure 20:
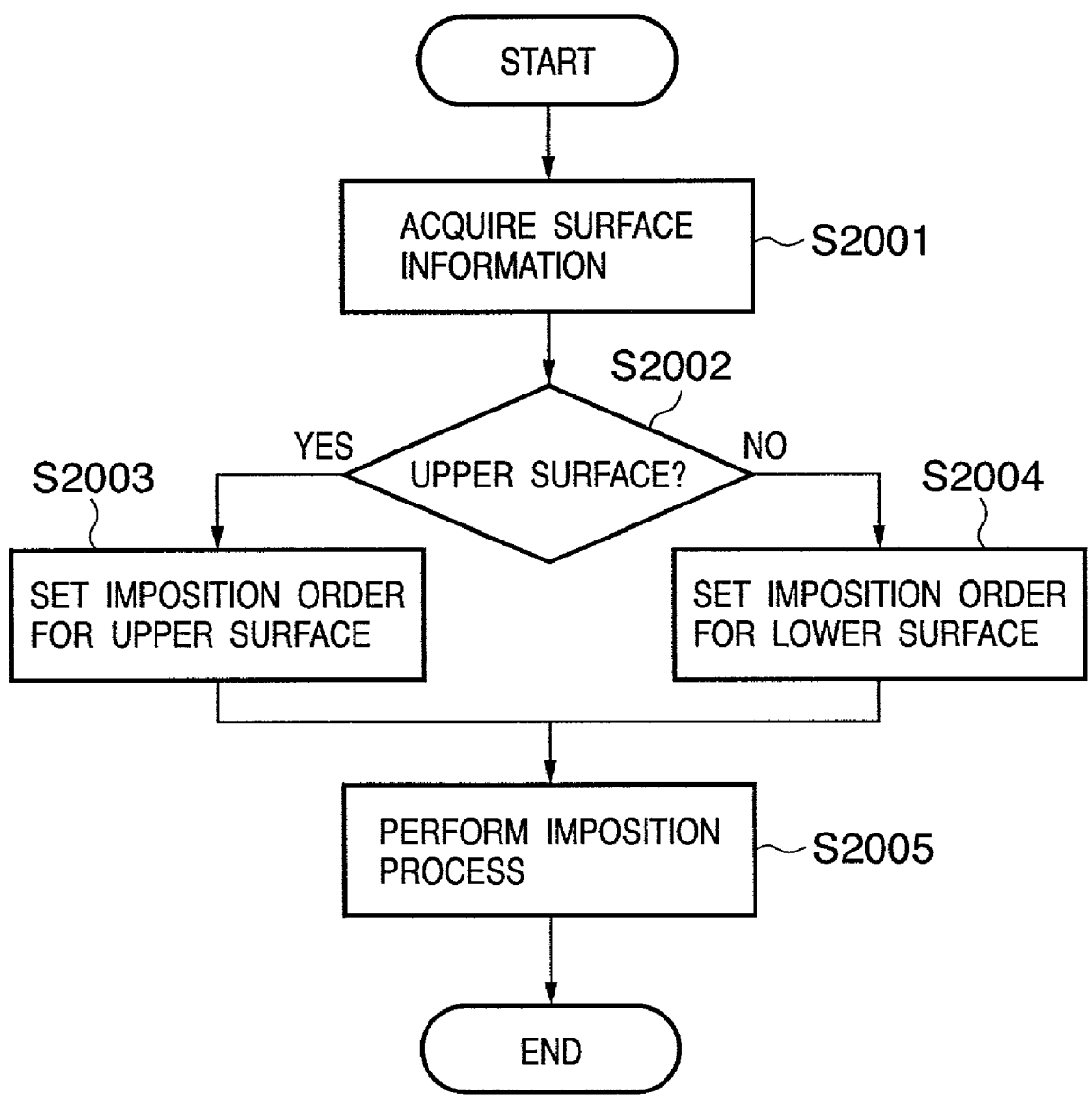
FIG. 20 is a flow chart showing the processing of changing the page orders on the upper and lower surfaces.

FIG. 20 is a flow chart showing processing for changing the page order on the upper surface with respect to the lower surface. This processing corresponds to an imposition process in the print processing in step S708 in FIG. 7. That is, this processing is based on the assumption that processing for checking whether data corresponding to the number of pages required for printing are prepared and the like have been done.

In step S2001, imposition information is acquired from the above job output setting file. Assume that in the case of a four-postcard sheet, a setting for a 2×2 arrangement, a setting for inhibiting enlargement/reduction of input data, and the like have been made. In step S2002, it is checked whether the surface to be subjected to an imposition process is the upper or lower surface. The processing for checking whether the surface is the upper or lower surface will be further described later with reference to FIG. 29. If it is determined that the surface is the upper surface, the flow advances to step S2003 to set a page order for the upper surface. If it is determined in step S2002 that the surface is the lower surface, the flow advances to step S2004 to set a page order for the lower surface. More specifically, control is performed to laterally reverse the page orders on the upper and lower surfaces with respect to each other. If, for example, data on the upper surface are arranged from upper left to upper right end, and then arranged from the left end to the right end on the lower level, data on the lower surface are arranged from upper right to upper left end, and then arranged from the right end to the left end on the lower level. In step S2005, an imposition process is performed in accordance with the imposition order set in step S2003 or S2004 depending on whether the upper or lower surface is determined. This processing is then terminated.

Note that the above page orders may be fixed in the system or the user may be allowed to designate a page order on one surface. This processing method can be applied to both 2 sided printing and 1 sided printing.

In the case of 2 sided printing, since data on the upper and lower surfaces are simultaneously processed, the data on the upper and lower surfaces can be automatically processed without any designation from the user. In the case of 1 sided printing, however, the user needs to designate with respect to the system that the current printing should be done on the upper or lower surface. This may be designated by, for example, a method of designating the upper or lower surface by GUI control using, for example, a simple check box. For example, it suffices to use a GUI like the one that allows the user to designate a four-postcard sheet with a "page layout" 801 in FIG. 8, and the upper or lower surface with "page order".

A specific GUI for selecting/designating a four-postcard sheet and the manner in which designation of "page order"

and other print settings is inhibited when "four-postcard sheet" is selected with "media type" will be described below.

Figure 26:
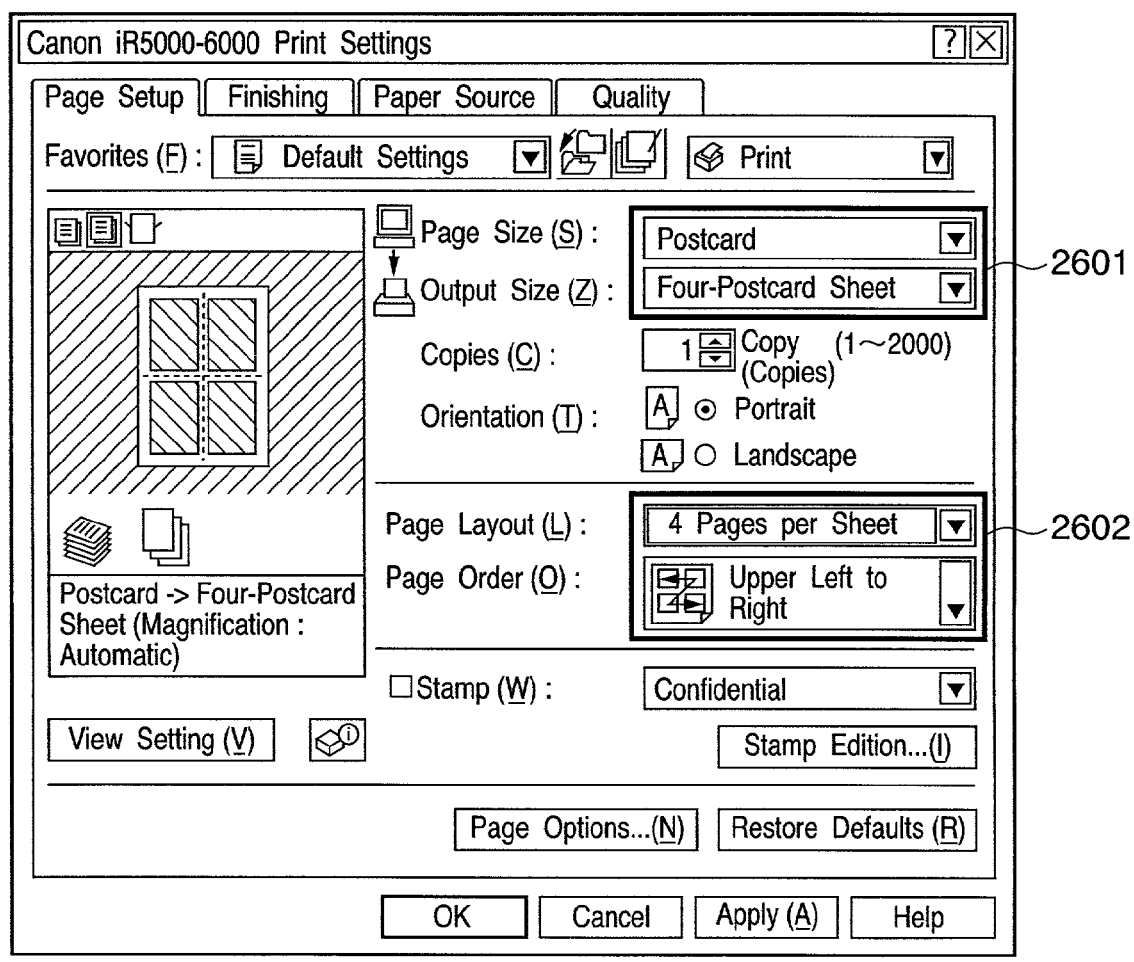
FIG. 26 is a view showing an example of a property dialog GUI for making print settings in a printer driver to set a four-postcard sheet.

FIG. 26 shows an example of a property dialog GUI (Graphic User Interface) for making print settings in a printer driver to set a four-postcard sheet. In this example, output operation for a four-postcard sheet can be designated by designating a four-postcard sheet in "output paper size" as indicated by "2601". In addition, in this example, since "original" is a postcard, printing is performed upon assignment of four pages to one sheet. A UI driver for controlling the GUI automatically changes the current page layout to page layout "4 pages per sheet" as indicated by "2602" upon setting of an output paper sheet.

If a four-postcard sheet is selected as an output paper sheet, the page layout is fixed to "4 pages per sheet". For this reason, the pull-down menu (also called combo box) of "page layout" indicated by "2602" is grayed out to inhibit the operator from selection/designation. In addition, since "page order" can be selected/designated by the operator, the pull-down menu of "page order" is so displayed by the UI driver as to be selected. "Page order" allows the operator to select one of "from upper left to upper right", "from upper left to bottom", "from upper right to bottom", and "from upper right to upper left". In addition, "finishing sheet" on the property dialog window is so displayed/controlled by the UI driver as to allow the operator to select/designate "2 sided printing" or "1 sided printing". Other settings, e.g., finishing setting, are so displayed/controlled as to inhibit the operator from selection. Furthermore, "sheet to be fed", "designation of paper feed method", and "designation of paper feed unit" are all grayed out by the UI driver to inhibit the operator to select.

Figure 27:
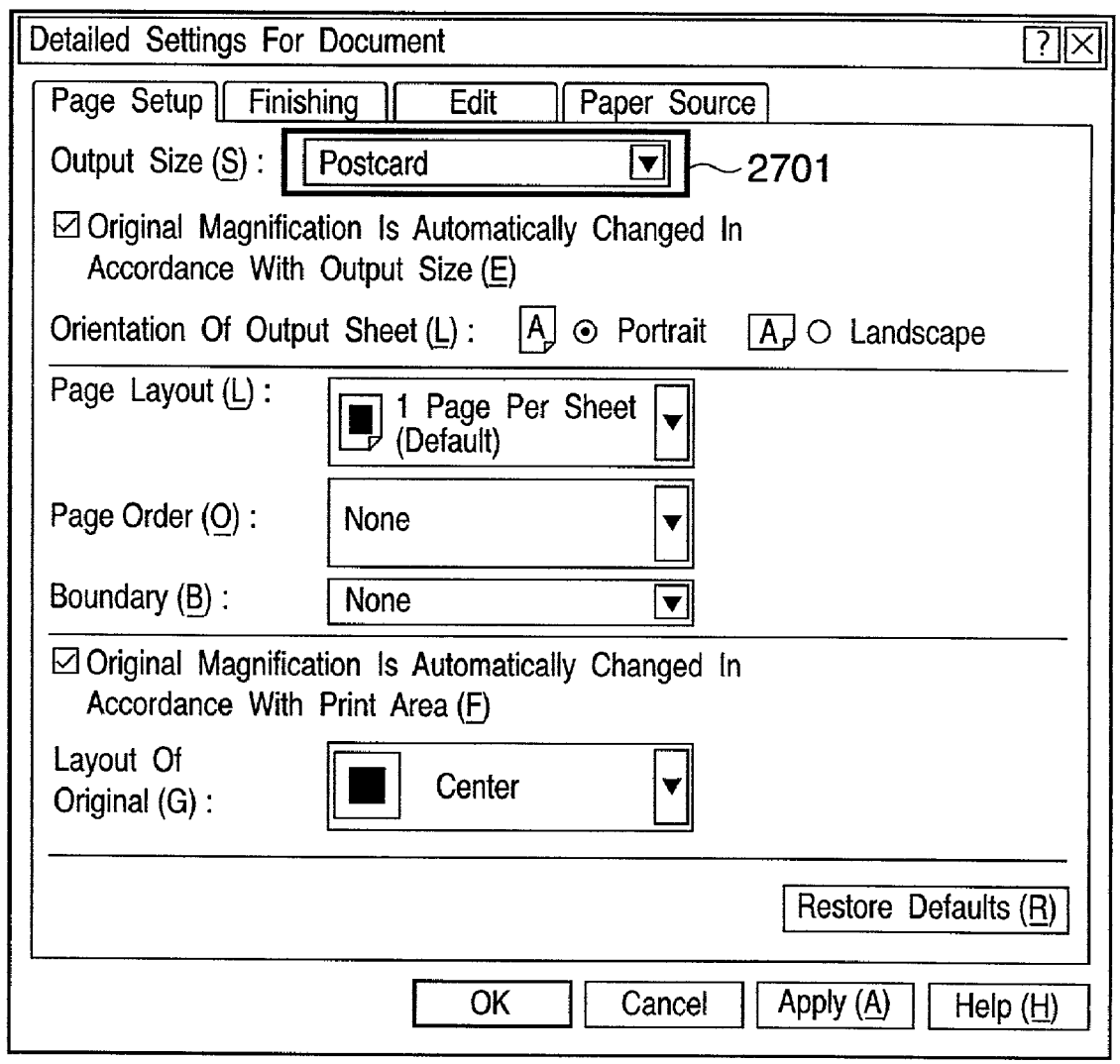
FIG. 27 is a view showing a specific example of a GUI for designating a four-postcard sheet.

FIG. 27 shows another specific example of the GUI for designating a four-postcard sheet. This may be a dialog window for print settings in the printer driver 203 or a dialog window used to make print settings from a menu provided by the application 201.

Figure 28:
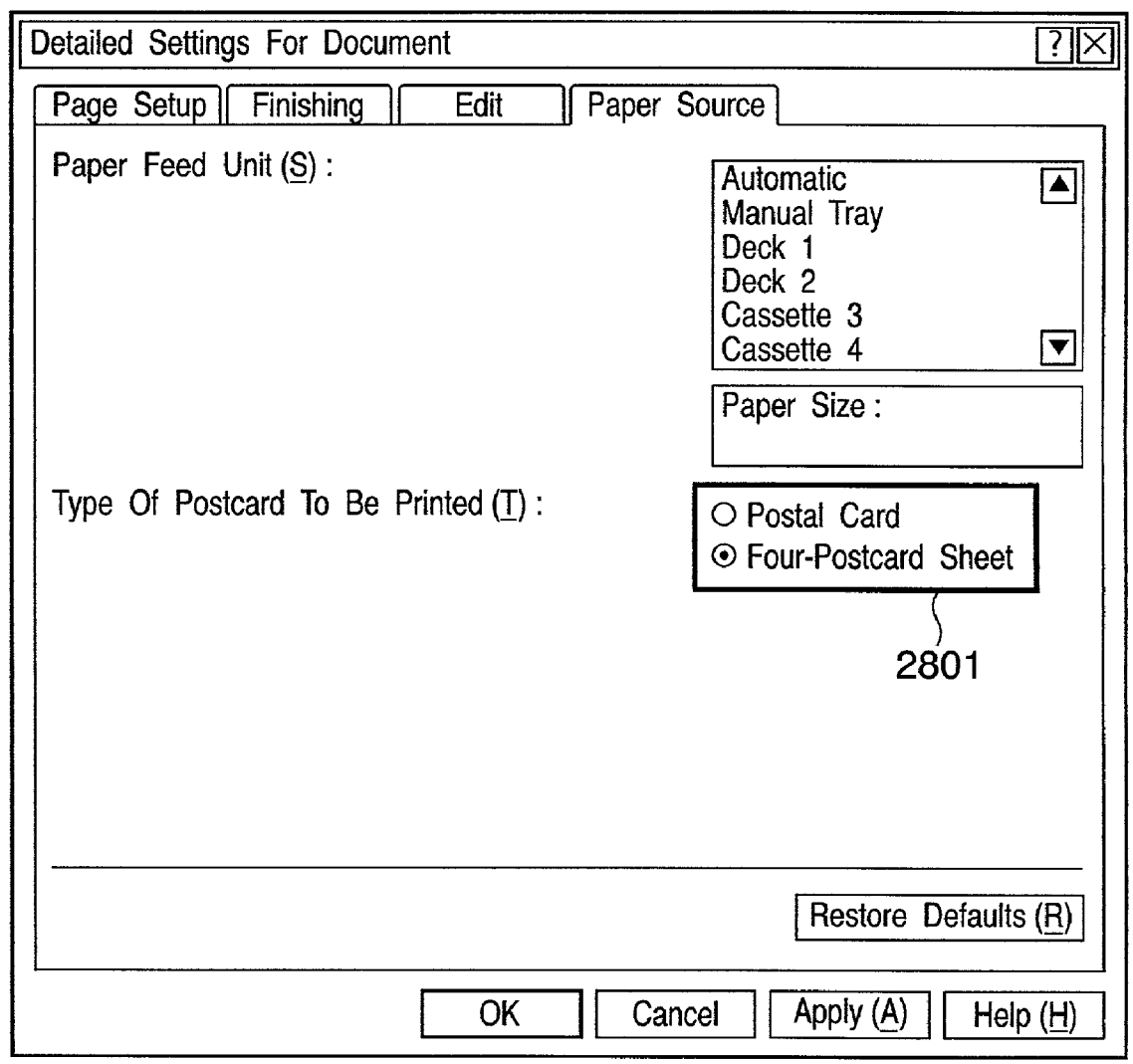
FIG. 28 is a view showing a radio button 2801 of a GUI for selecting a postcard type upon selection of a postcard with an output sheet setting 2701 in FIG. 27.

In this system, output paper is "postcard", and "postcard" or "four-postcard sheet" is selected as a postcard type. When a postcard is selected with an output paper setting 2701 in FIG. 27, a radio button 2801 of the GUI which is used to select a postcard type in FIG. 28 is activated to allow the user to select a general postcard or a paper sheet having a plurality of surface areas printed simultaneously. In the system according to this embodiment, the use of a sheet having four surface areas on which data can be printed is assumed. In this example, therefore, the user selects either "postcard" or "four-postcard sheet". Obviously, however, the system can be extended to use, for example, sheets having two, six, and eight surface areas. In the example, classifications are set in different tabs. However, they may be set in the same tab.

The processing of determining the upper or lower surface in step S2002 in FIG. 20 described above will be described in detail next. For example, the printer driver communicates with an application through an enhanced API to determine whether to designate the form of outputting all lower-surface pages after all address pages or the form of outputting the first address page and the first lower-surface page, . . . , and the Nth address page and the Nth lower-surface page. Alternatively, the printer driver instructs the application to output four lower-surface logical pages after four upper-surface logical pages.

Figure 29:
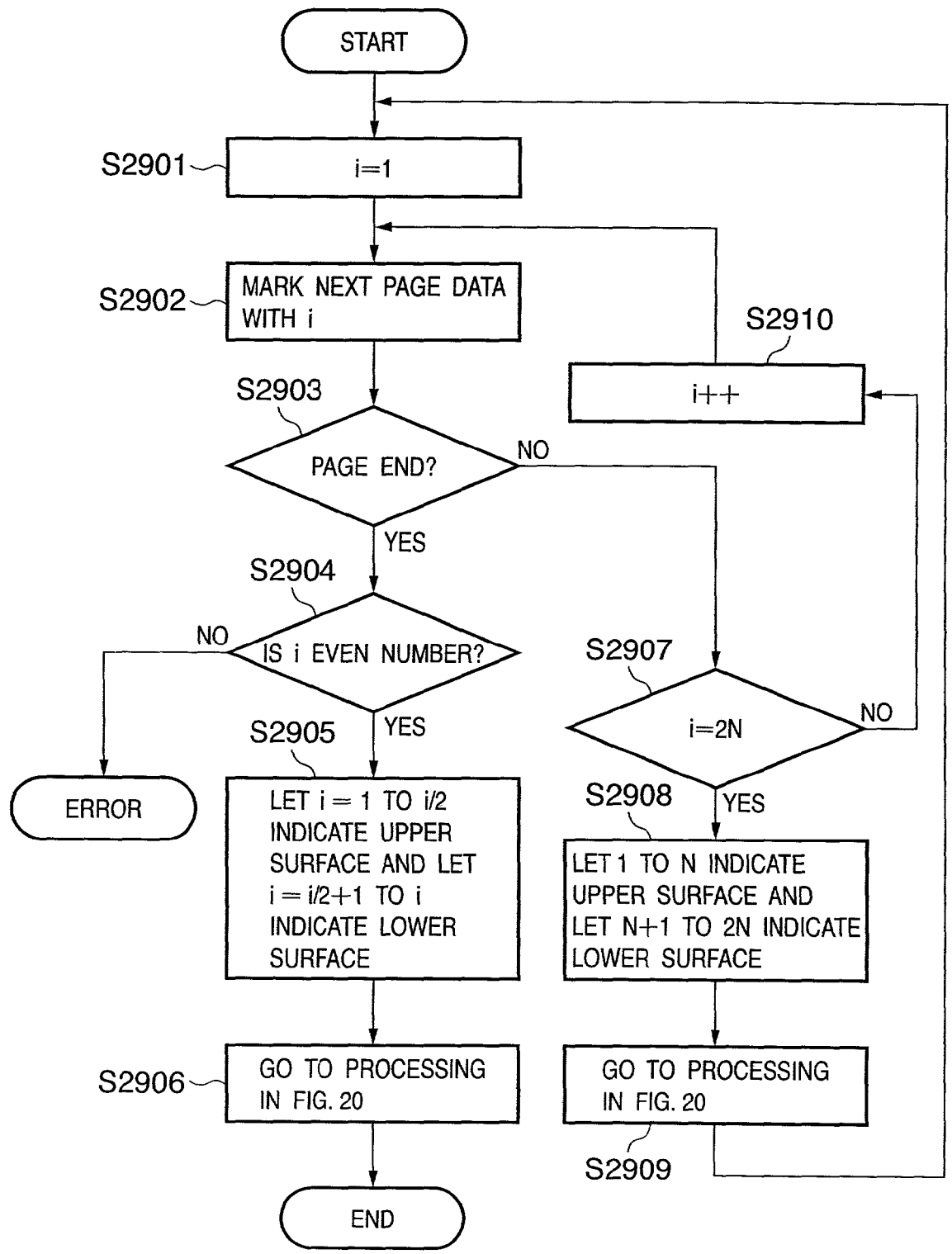
FIG. 29 is a flow chart showing processing serving as the basis of processing for determining an upper or lower surface by the despooler 305.

FIG. 29 is a flow chart showing processing based on which determination on an upper or lower surface is performed by the despooler 305. Assume that in this example, upper-surface data as pages are arranged on one physical page by the number of pages to be laid out, lower-surface data are then arranged on one physical page by the number of pages to be laid out, and this set of operations is repeated.

In step S2901, the despooler 305 initializes a counter i to 1. In step S2902, the despooler 305 extracts one page from a page data list and associates it with the counter i. In step S2903, the despooler 305 checks whether a page can be extracted in step S2902 or cannot be extracted because processing for all pages to be processed is completed. If there is no page to be processed, the flow advances to step S2904. If there is a page to be processed, the flow advances to step S2907.

In step S2904, the despooler 305 checks whether the counter i is an odd or even number. If this value is an odd number, it indicates that the number of pages on the upper surface does not match the number of pages on the lower surface. Therefore, an error is determined. If the counter i is an even number, the flow advances to step S2905 to determine the upper or lower surface in accordance with the counter value associated in step S2902. This processing is performed when the number of data is an odd sum, e.g., data corresponding to six or four pages, in spite of the fact that when an imposition process is performed for four surface areas indicated by N=4, a total of eight pages on the upper and lower surfaces are required. In the case of six pages, i=6, and it is determined that the 1st to (i/2)th pages, i.e., the 1st to 3rd pages, are upper-surface pages, and the (i/2+1)th to ith pages, i.e., the 4th to 6th pages, are lower-surface pages. In this stage, since all the data are completely allocated to the upper and lower surfaces of one paper sheet, the flow advances to the processing shown in FIG. 20, thereby performing an imposition process for the upper- and lower-surface pages.

If it is determined in step S2903 that there is a page to be processed, the flow advances to step S2907 to compare the counter i with the number of pages impositioned. If N =4, it is checked whether processing for eight (=2*N) pages, which is the total number of pages on the upper and lower surfaces, is completed. If processing for 2N pages is completed, the flow advances to step S2908 to allocate the 1st to Nth pages as upper-surface pages, and the (N+1)th to 2Nth pages as lower-surface pages. In this step, the data corresponding to all the upper- and lower-surface pages on one sheet are completely allocated, the flow advances to step S2909 to perform an imposition process in the same manner as in step S2905. The flow then returns to step S2901 to process the next sheet. The above processing is then repeated.

If it is determined in step S2907 that processing for 2N pages, i.e., eight pages, is not completed, since page allocation for one sheet is not completed, the flow advances to step S2910 to increment the counter i. The flow then returns to step S2902 to process the next page.

Figure 30:
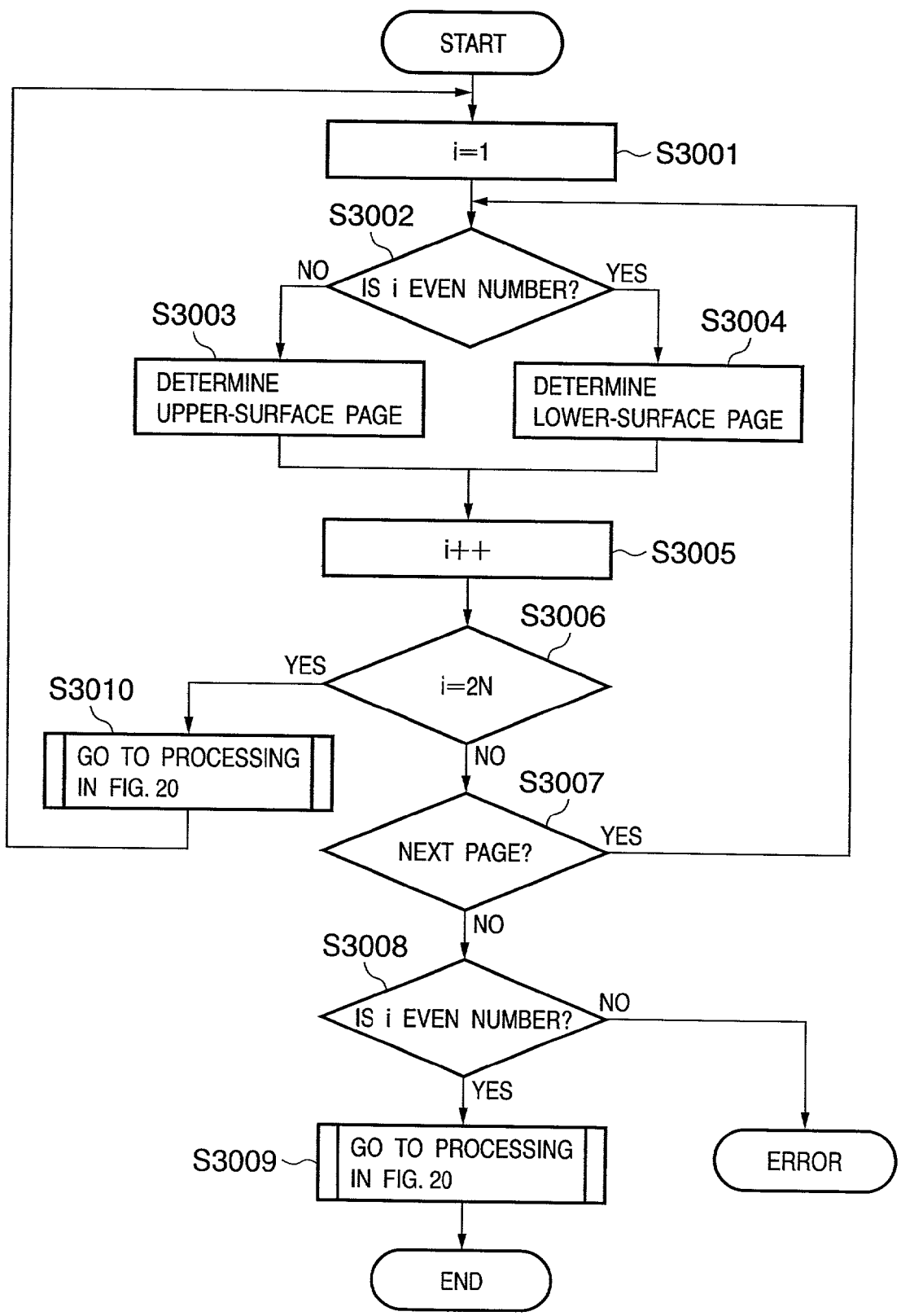
FIG. 30 is a flow chart showing the processing of assigning upper- and lower-surface data when the processing order of original page data is the first upper surface, first lower surface, second upper surface, second lower surface, . . .
Figure 31:
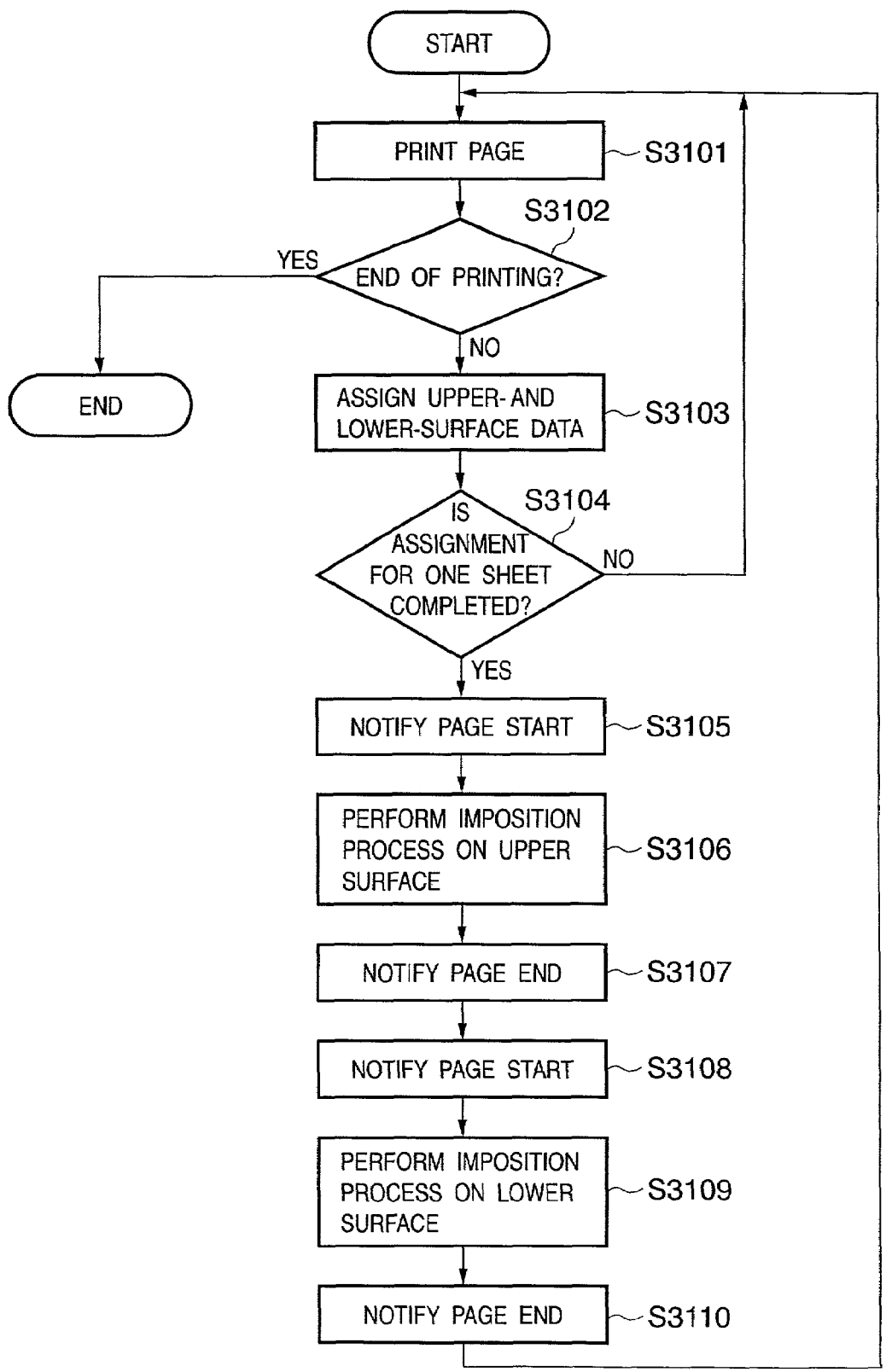
FIG. 31 is a flow chart showing the processing of generating print data by a printer driver or print tool.

FIG. 30 is a flow chart showing the processing of allocating upper- and lower-surface pages when the processing order of original page data is the first upper-surface page, the first lower-surface page, the second upper-surface page, the second lower-surface page, . . . In step S3001, the counter i is initialized. In step S3002, page data as the next determination target is extracted, and it is checked whether the counter i is an even or odd number. If it is determined that the counter i is an odd number, the flow advances to step S3003 to determine that the corresponding page is an upper-surface page. If it is determined that the counter i is an even number, the flow advances to step S3004 to determine that the corresponding page is a lower-surface page. In either case, the flow advances to step S3005 to increment the counter i.

The flow advances to step S3006 to check whether processing for 2N pages, i.e., the value of the counter i and the total number of upper- and lower-surface pages, is completed. If it is determined that processing for one sheet is completed, the flow advances to step S3010 to perform the imposition process shown in FIG. 20. If it is determined in step S3006 that processing for one sheet is not completed, the flow advances to step S3007 to check whether there is any page as a processing target. If the next page exists, the flow returns to step S3002 to process the next processing target page and repeat the above processing. If it is determined that no page is left, the flow advances to step S3008 to check whether the counter i is an even number. If the counter i is an odd number, it indicates that the number of pages on the upper surface does not match the number of pages on the lower surface, and hence an error is determined. If the counter i is an even number, the flow advances to step S3009 to perform the imposition process shown in FIG. 20.

The processing of storing physical page information in a job output setting file (steps S607 and S608 in FIG. 6) will be described in detail next.

Figure 25:
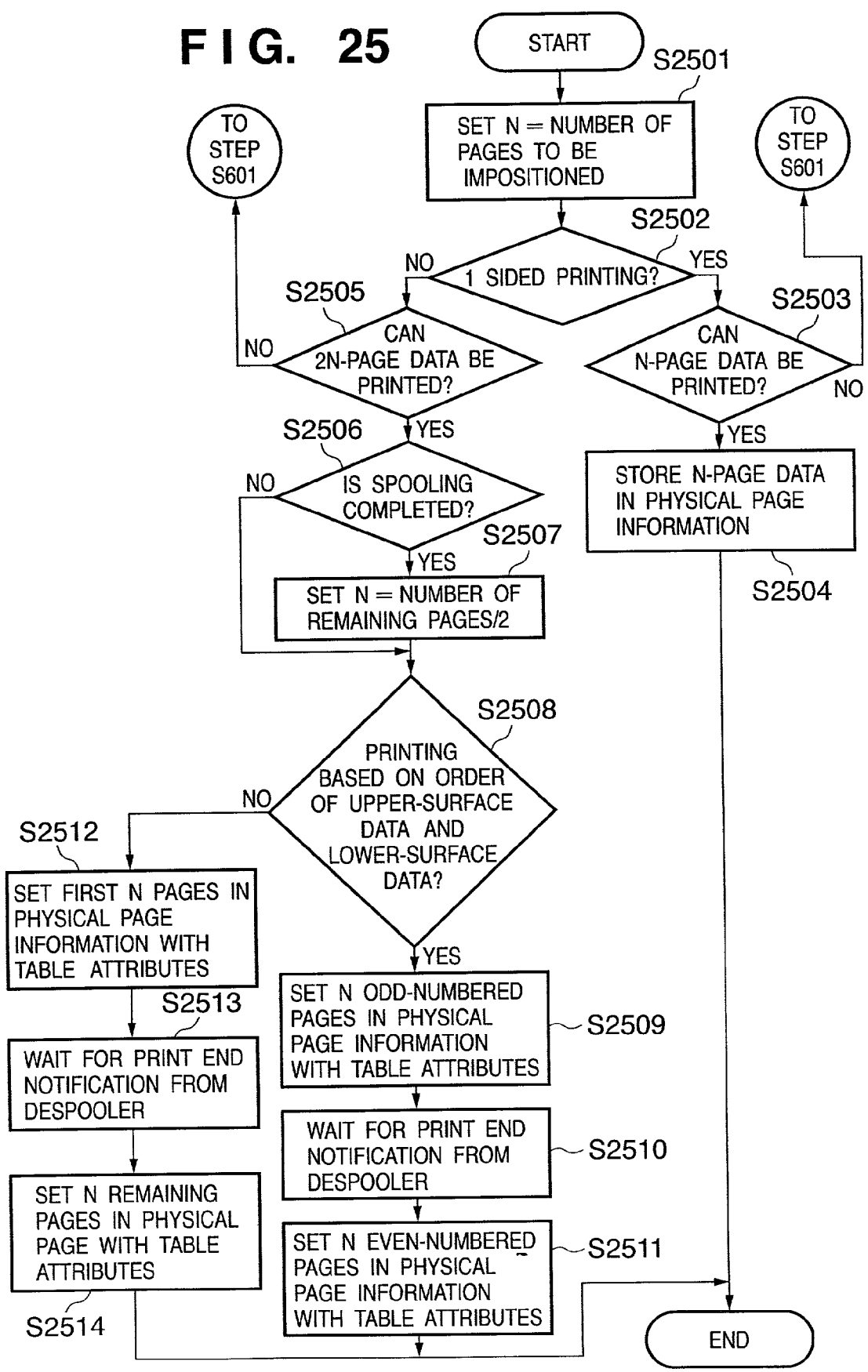
FIG. 25 is a flow chart showing the processing of storing physical page information.

FIG. 25 is a flow chart showing the processing of storing physical page information. In step S2501, an imposition page count N on one surface is acquired from the spool file. In step S2502, it is checked whether 1 sided printing is designated. If 1 sided printing is determined, the flow advances to step S2503 to check whether N pages can be printed. More specifically, it is checked whether N pages can be printed or the remaining pages are completely spooled even through they are less in number than N. If it is determined that N pages can be printed or the remaining pages are completely spooled even through they are less in number than N, the flow advances to step S2504; otherwise, the flow returns to step S601 to wait for the next input. In step S2504, N page data are stored or the remaining pages are stored as physical page information, and it is then notified that the physical page can be printed.

If it is determined in step S2502 that 2 sided printing is designated, the flow advances to step S2505 to check whether data corresponding to a total of 2N pages on both the surfaces can be printed or the last sheet is processed upon completion of spooling. If NO in step S2505, the flow returns to step S601. If YES in step S2505, the flow advances to step S2506 to check whether spooling is completed. If NO in step S2506, the flow advances to step S2508. If YES in step S2506, since printing is performed on the last sheet, N is set again considering that half of the number of pages currently spooled is the number of pages impositioned per surface. The flow then advances to step S2508.

It is checked in step S2508 whether the printing order designated by the application is "upper surface 1, lower surface 1, upper surface 2, lower surface 2, ..." or "upper surface 1, upper surface 2, ..., lower surface 1, lower surface 2, ...". In the former case, the flow advances to step S2509 to store all odd-numbered pages as upper-surface pages in the form of N page physical page information and notify that printing can be performed. The flow then advances to step S2510 to wait for a printing end notification from the despooler 305. The flow then advances to step S2511 to set N even-numbered pages in physical page information and notify that printing can be performed.

If it is determined in step S2508 that the printing order is that N upper-surface pages are continuously printed first, and then N lower-surface pages are printed, the flow advances to step S2512 to set the first N pages in physical page information. The flow then advances to step S2513 to wait for a printing end notification from the despooler 305. If a printing end notification is made, the flow advances to step S2514 to set the remaining (N+1)th to 2Nth pages in physical page information and notify the despooler 305 of the corresponding information.

A case where when there is a sheet is used halfway, printing is performed on the remaining portion to save the sheet will be described next.

FIG. 24 is a view for explaining the concept of the processing of printing data on the remaining portion of a sheet that is used halfway. In the case shown in FIG. 24, the upper left portion of a four-postcard sheet has already been used, but the three remaining areas are left unused. In this case, next printing is started from the upper right to the lower row in the order of the numbers assigned to the respective areas. This printing order is changed for the second and subsequent sheets such that printing is performed on all areas, because there is no need to use sheets that are used halfway.

Figure 23:
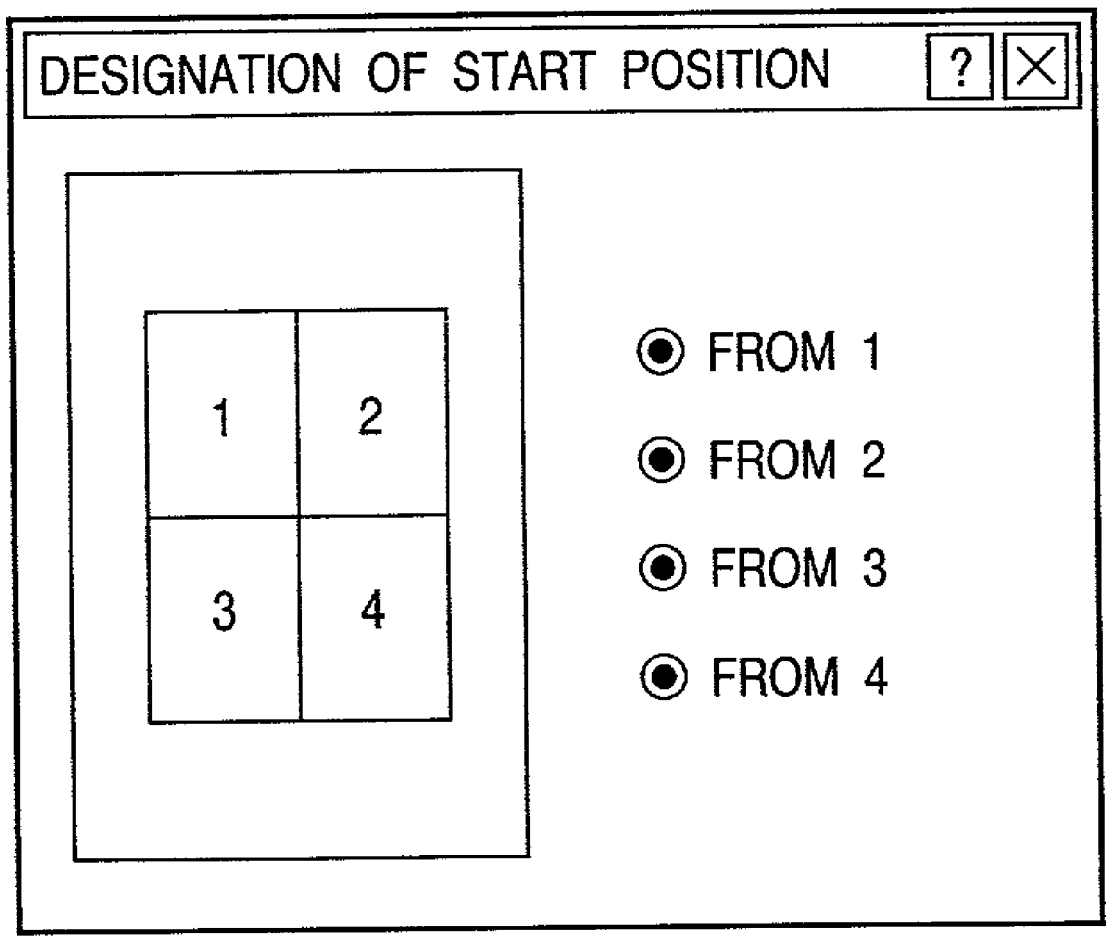
FIG. 23 is a view showing a GUI for setting a used portion of the first sheet.

FIG. 23 shows a GUI for setting a used portion of the first sheet. This GUI is based on the scheme of designating a specific one of the areas of a four-postcard sheet from which printing is started. The GUI allows the user to select one of four choices with a radio button. In contrast to this, a method of designating the number of used areas with a number, and a GUI for allowing the user to designate the number of areas that can be used may be used. The latter method is versatile considering that sheets other than a four-postcard sheet, e.g., eight-postcard sheet, will appear in the future.

Figure 21:
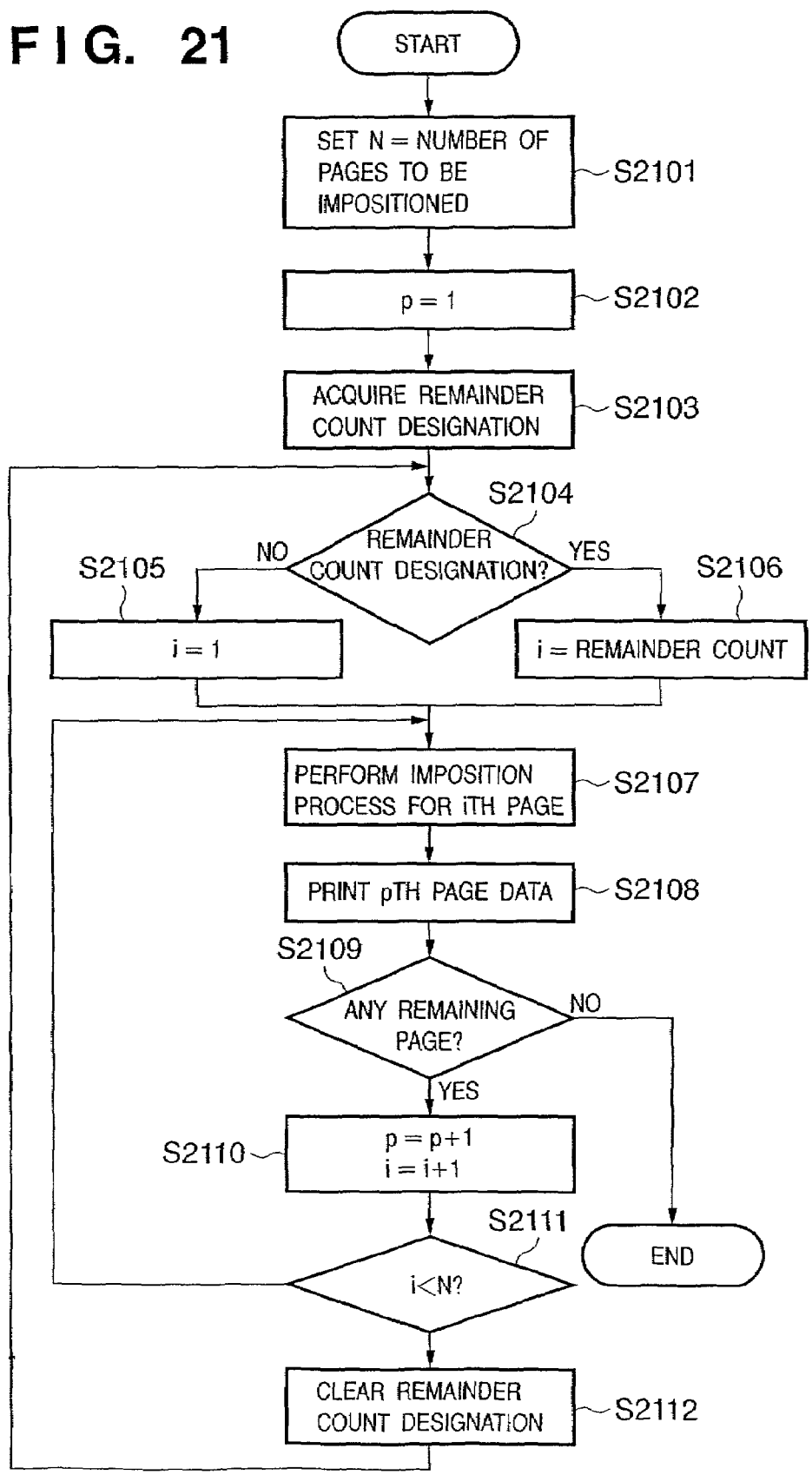
FIG. 21 is a flow chart showing the processing to be performed when printing is continuously performed on a used sheet.

FIG. 21 is a flow chart showing the processing to be performed when printing is continuously performed on a sheet that has been used. In step S2101, setting information is acquired from the spool file 303, and the number of pages to be impositioned on one sheet is set to N. In step S2102, the page count is initialized to "1". In step S2103, information associated with the remaining portion of the sheet is acquired from the setting information acquired in step S2101. In step S2104, it is checked whether remainder count information is designated. If YES in step S2104, the flow advances to step S2106. If NO in step S2104, the flow advances to step S2105.

In step S2105, a parameter i is initialized to "1". In step S2106, i is set to the remainder count (the number of printed areas +1). The flow then advances to step S2107 to perform an imposition process for the ith page. In step S2108, the pth page data is printed in accordance with the imposition information obtained in step S2107. The flow then advances to step S2109 to check whether any page to be printed is left. If all pages are printed, this processing is terminated. If there is any page to be printed, the flow advances to step S2110 to increment each of the parameters i and p by one. The flow then advances to step S2111.

In step S2111, the parameters i and N are compared with each other to check whether an imposition process for all the areas on the sheet is completed. If it is determined that there is an area to be subjected to an imposition process, the flow returns to step S2107 to imposition the next page. If it is determined that all the areas are filled with pages, the flow advances to step S2112 to clear the designated remainder count. By clearing the designated remainder count, print processing for the next and subsequent sheets is performed by using all areas. The flow returns to step S2104 to process the next sheet.

In the above procedure, processing for the first page is switched to processing for the second and subsequent sheets depending on whether a remainder count setting is made or not. If, however, the first loop processing is specialized, the number of steps inside the loop can be decreased. This method is therefore advantageous in terms of speed.

Figure 22:
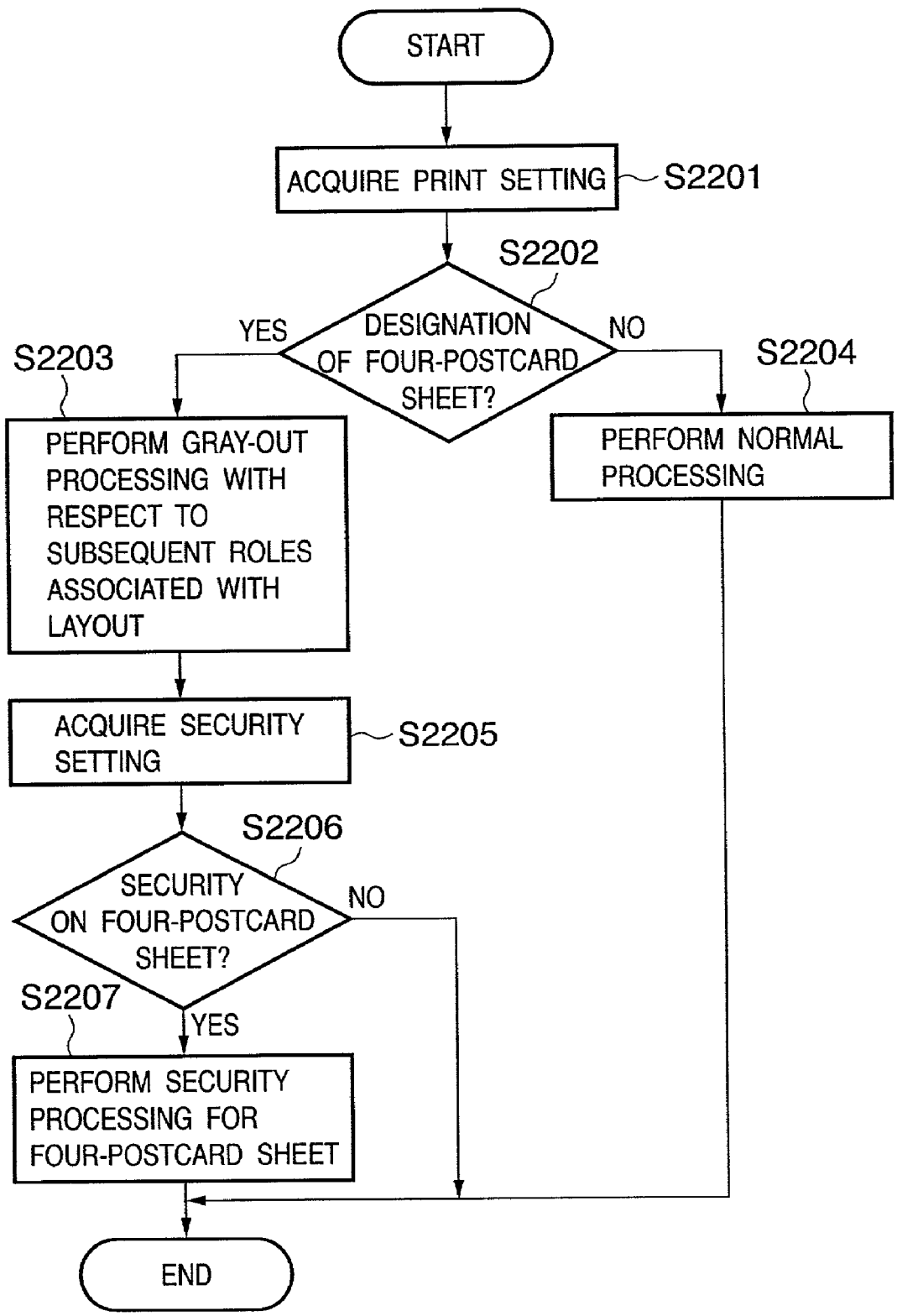
FIG. 22 is a flow chart showing layout setting and security processing to be performed upon designation of a four-postcard sheet.

FIG. 22 is a flow chart showing a procedure for setting a layout and performing security processing with respect to designation of a four-postcard sheet. In step S2201, setting information for a GUI is acquired. In step S2202, it is checked whether a four-postcard sheet is designated. If it is determined that a four-postcard sheet is designated, the flow advances to step S2203 to perform, for example, graying out to indicate that other layout designations are invalid. In this case, the target items correspond to, for example, Nup, binding margin, and zoom, although they depend on the system. That is, any settings that influence the fixed layout of "four-postcard sheet" are target items.

In step S2205, security setting information is acquired. In step S2206, it is checked whether security is provided for a four-postcard sheet. If YES in step S2206, the flow advances to step S2207 to perform security processing. This security processing varies depending on the settings for system management. Assume that only a specific user is permitted to make settings for a four-postcard sheet. In this case, security processing corresponds to the processing of displaying, to an unauthorized user, a message indicating that setting is inhibited and canceling the setting made by the user. Assume also that an upper limit is set for each item. In this case, security processing may be performed to display a message when the upper limit of a given item is exceeded or about to be exceeded, and to inhibit printing in some cases.

It is determined in step S2202 that a four-postcard sheet is not designated, the flow advances to step S2204 to perform normal processing.

As has been described above, according to this embodiment, when a plurality of page data are arranged and printed on one sheet or a sheet is segmented into a plurality of areas and at least one of data on the segmented areas of the sheet differs from the remaining data, corresponding data can be printed on the upper and lower surfaces of the sheet.

In the case of 2 sided printing, whether the current printing is printing on the upper surface or lower surface can be automatically determined.

The user can designate the upper or lower surface of a sheet through a GUI.

The user can designate the upper or lower surface of a sheet without any GUI.

In making a layout that is always uniquely determined with respect to a specific type of sheet, when the specific type of sheet is designated, a GUI for print settings can be controlled to inhibit the user from making any settings that influence the layout through the GUI.

In addition, security setting processing can be performed such that security processing, charging, and the like are performed upon designation of a specific type of sheet.

If a four-postcard sheet having four postcards arranged in a 2×2 matrix is selected, control may be automatically performed to inhibit the user from making any settings that influence the layout, or security and charging settings may be automatically made.

Furthermore, it can be designated that part of a sheet has already been used, and the remaining portion can be reused for the next printing operation.

Even if a sheet is to be reused, new sheets can be used for the next and subsequent printing operations by using all the areas of the sheets.

In the above processing, the despooler has been described as processing performed by the spool file manager, and hence its description has ended with the description of the page layout. Processing will be described below, in which the printer driver or print tool generates print data on the basis of a document having undergone page layout in the above manner.

FIG. 30 is a flow chart showing the processing of generating print data by using the printer driver or print tool. In step S3101, page data to be printed is spooled. In step S3102, it is checked whether printing is completed. If NO in step S3102, since there is page data to be processed, the flow advances to step S3103 to perform assignment of upper- and lower-surface data. The flow then advances to step S3104 to check whether assignment for one sheet is completed. If NO in step S3104, the flow returns to step S3101 to continue processing for the next page.

If processing for one sheet is completed, the flow advances to the processing of actually making the printer driver print. In step S3105, the print driver is notified of the page start. In the case of software that operates on Windows, for example, a notification of the start of processing for the next surface can be transferred to the printer driver by invoking StartPage( ) with respect to the GDI. In step S3106, an imposition process for the upper surface is performed, and printing is performed. When this printing on the upper surface is completed, the flow advances to step S3107 to perform page end processing to indicate the completion of processing for one surface. In the case of software that operates on Windows, when EndPage( )API is invoked with respect to the GDI, the printer driver receives a notification indicating the end of processing for one surface, and prepares for processing for the next surface.

Since assignment of upper- and lower-surface data has been done in step S3103, the flow advances to step S3108 to perform processing for the lower surface. In the case of software that operates on Windows, if 2 sided printing is designated in DEVMODE at the start of printing, the next page is automatically printed on the lower surface by notifying the start of processing for the next page in step S3108 without any need to specifically notify processing for the lower surface. The processing in steps S3108 to S3110 is similar to the processing in steps S3105 to S3107. In steps S3106 and S3109, different imposition processes are performed in accordance with the upper and lower surfaces, as shown in FIG. 20, in order to process data to be printed on the upper and lower surfaces.

When page end processing is performed in step S3110, the print processing for the upper and lower surfaces of one sheet is terminated. The flow then returns to step S3101 to repeat the above processing to print data on the next sheet. If it is determined in step S3101 that the application ends the print processing, it is determined in step S3102 that there is no data to be processed. The print processing is then terminated.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium.

In this case, the program codes read out from the storage medium realize the functions of the above-described embodiment by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, a sheet can be segmented into a plurality of areas, and upper- and lower-surface data can be laid out in the respective segmented areas in correspondence with each other.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for generating print data to output print material wherein a plurality of pages output from an application are arranged in a plurality of areas in which a front surface and a back surface of a sheet are respectively segmented, comprising:
    sorting means for sorting the plurality of pages into front surface pages to be arranged on the front surface of the sheet and back surface pages to be arranged on the back surface of the sheet based on the output form of the plurality of pages output from the application;
    setting means for, in a case where the sheet is cut into the plurality of areas, determining the front surface pages and back surface pages to be arranged on the front surfaces and the back surfaces of the plurality of areas as cut, and setting arranged positions of the determined pages for the front surfaces of the plurality of areas as cut and the determined pages for the back surfaces of the plurality of areas as cut; and
    generating means for generating the print data based on the arranged positions set by said setting means to output the print material such that the plurality of pages are arranged in the plurality of areas on the front surface and the back surface of the sheet,
    wherein the front surface pages are arranged on the front surface of the sheet and the back surface pages are arranged on the back surface of the sheet, in consecutive order, respectively.

2. The apparatus according to claim 1, wherein, when all back surface pages are output after all front surface pages are output from the application, the all front surface pages and the all back surface pages are sorted into the front surface pages and the back surface pages based on a number of pages arranged on the front surface and back surface of the sheet, and when a front surface page and a back surface page are alternately output from the application, the front surface page and the back surface page are alternately sorted.

3. The apparatus according to claim 1, further comprising print setting means for setting print setting information on processing for the front surface or the back surface of the sheet as designated by a user.

4. The apparatus according to claim 1, wherein the output form of the plurality of pages output from the application is designated by the application.

5. The apparatus according to claim 1, wherein when a layout that is always uniquely determined by a specific type of sheet is to be made, and the specific type of sheet is designated, a print setting GUI is controlled so as not to make any setting that influences the layout.

6. The apparatus according to claim 1, further comprising spool means for, before generating print data to be transmitted to a printer, temporarily storing the print data in an intermediate code form of a data form different from a data form of the print data, despool means for generating the print data to be transmitted to the printer from the data temporarily stored in the intermediate code form, and means for generating a control command to the printer.

7. A print control method for an information processing apparatus for generating print data to output print material wherein a plurality of pages output from an application are arranged in a plurality of areas in which a front surface and a back surface of a sheet are respectively segmented comprising:
    a sorting step of sorting the plurality of pages into front surface pages to be arranged on the front surface of the sheet and back surface pages to be arranged on the back surface of the sheet based on the output form of the plurality of pages output from the application;
    a setting step of, in a case where the sheet is cut into the plurality of areas, determining the front surface pages and back surface pages to be arranged on the front surfaces and the back surfaces of the plurality of areas as cut, and setting arranged positions of the determined pages for the front surfaces of the plurality of areas as cut and the determined pages for the back surfaces of the plurality of areas as cut; and
    a generating step of generating the print data based on the arranged positions set by said setting step to output the print material such that the plurality of pages are arranged in the plurality of areas on the front surface and the back surface of the sheet,
    wherein the front surface pages are arranged on the front surface of the sheet and the back surface pages are arranged on the back surface of the sheet, in consecutive order, respectively.

8. The method according to claim 7, wherein, when all back surface pages are output after all front surface pages are output from the application, the all front surface pages and the all back surface pages are sorted into the front surface pages and the back surface pages based on a number of pages arranged on the front surface and the back surface of the sheet, and when a front surface page and a back surface page are alternately output from the application, the front surface page and the back surface page are alternately sorted.

9. The method according to claim 7, further comprising a print setting step of setting print setting information on processing for the front surface or the back surface of the sheet as designated by a user.

10. The method according to claim 7, wherein the output form of the plurality of pages output from the application is designated by the application.

11. The method according to claim 7, wherein when a layout that is always uniquely determined by a specific type of sheet is to be made, and the specific type of sheet is designated, a print setting GUI is controlled so as not to make any setting that influences the layout.

12. The method according to claim 7, further comprising a spool step of, before generating print data to be transmitted to a printer, temporarily storing the print data in an intermediate code form of a data form different from a data form of the print data, a despool step of generating the print data to be transmitted to the printer from the data temporarily stored in the intermediate code form, and a step of generating a control command to the printer.

13. A computer readable storage medium on which is stored a computer-executable program for a print control method for an information processing apparatus for generating print data to output print material wherein a plurality of pages output from an application are arranged in a plurality of areas in which a front surface and a back surface of a sheet are respectively segmented, the program comprising:

a sorting module for sorting the plurality of pages into front surface pages to be arranged on the front surface of the sheet and back surface pages to be arranged on the back surface of the sheet based on the output form of the plurality of pages output from the application;

a setting module for, in a case where the sheet is cut into the plurality of areas, determining the front surface pages and back surface pages to be arranged on the front surfaces and the back surfaces of the plurality of areas as cut, and setting arranged positions of the determined pages for the front surfaces of the plurality of areas as cut and the determined pages for the back surfaces of the plurality of areas as cut; and a generating module for generating the print data based on the arranged positions set by said setting step to output the print material such that the plurality of pages are arranged in the plurality of areas on the front surface and the back surface of the sheet, wherein the front surface pages are arranged on the front surface of the sheet and the back surface pages are arranged on the back surface of the sheet, in consecutive order, respectively.

14. The medium according to claim 13, wherein, when all back surface pages are output after all front surface pages are output from the application, the all front surface pages and the all back surface pages are sorted into the front surface pages and the back surface pages based on a number of pages arranged on the front surface and the back surface of the sheet, and when a front surface page and a back surface page are alternately output from the application, the front surface page and the back surface page are alternately sorted.

15. The medium according to claim 13, further comprising a print setting module for setting print setting information on processing for the front surface or the back surface designated by a user.

16. The medium according to claim 13, wherein the output form of the plurality of pages output from the application is designated by the application.

17. The medium according to claim 13, wherein when a layout that is always uniquely determined by a specific type of sheet is to be made, and the specific type of sheet is designated, a print setting GUI is controlled so as not to make any setting that influences the layout.

18. The medium according to claim 13, further comprising:
a spool module for, before generating print data to be transmitted to a printer, temporarily storing the print data in an intermediate code form of a data form different from a data form of the print data; and
a despool module for generating the print data to be transmitted to the printer from the data temporarily stored in the intermediate code form.

19. A computer-executable program stored in a computer-readable storage medium, the program causing a computer to execute a print control method for an information processing apparatus for generating print data to output print material wherein a plurality of pages output from an application are arranged in a plurality of areas in which a front surface and a back surface of a sheet are respectively segmented, the program comprising:

a sorting step of sorting the plurality of pages into front surface pages to be arranged on the front surface of the sheet and back surface pages to be arranged on the back surface of the sheet based on the output form of the plurality of pages output from the application;

a setting step of, in a case where the sheet is cut into the plurality of areas, determining the front surface pages and back surface pages to be arranged on the front surfaces and the back surfaces of the plurality of areas as cut, and setting arranged positions of the determined pages for the front surfaces of the plurality of areas as cut and the determined pages for the back surface of the plurality of areas as cut; and a generating step of generating the print data based on the arranged positions set by said setting step to output the print material such that the plurality of pages are arranged in the plurality of areas on the front surface and the back surface of the sheet, wherein the front surface pages are arranged on the front surface of the sheet and the back surface pages are arranged on the back surface of the sheet, in consecutive order, respectively.

20. The program according to claim 19, wherein, when all back surface pages are output after all front surface pages are output from the application, the all front surface pages and the all back surface pages are sorted into the front surface pages and the back surface pages based on a number of pages arranged on the front surface and the back surface of the sheet, and when a front surface page and a back surface page are alternately output from the application, the front surface page and the back surface page are alternately sorted.

21. The program according to claim 19, further comprising a print setting step of setting print setting information on processing for the front surface or the back surface as designated by a user.

22. The program according to claim 19, wherein the output form of the plurality of pages output from the application is designated by the application.

23. The program according to claim 19, wherein when a layout that is always uniquely determined by a specific type of sheet is to be made, and the specific type of sheet is designated, a print setting GUI is controlled so as not to make any setting that influences the layout.

24. The program according to claim 19, wherein the program further comprises:
a spool step of, before generating print data to be transmitted to a printer, temporarily storing the print data in an intermediate code form of a data form different from a data form of the print data, and
a despool step of generating the print data to be transmitted to the printer from the data temporarily stored in the intermediate code form.

* * * * *